US010225680B2

(12) United States Patent
Donaldson

(10) Patent No.: US 10,225,680 B2
(45) Date of Patent: Mar. 5, 2019

(54) MOTION DETECTION OF AUDIO SOURCES TO FACILITATE REPRODUCTION OF SPATIAL AUDIO SPACES

(71) Applicant: Thomas Alan Donaldson, London (GB)

(72) Inventor: Thomas Alan Donaldson, London (GB)

(*) Notice: Subject to any disclaimer, the term of this patent is extended or adjusted under 35 U.S.C. 154(b) by 27 days.

(21) Appl. No.: 13/954,367

(22) Filed: Jul. 30, 2013

(65) Prior Publication Data
US 2015/0036848 A1    Feb. 5, 2015

(51) Int. Cl.
  *H04R 5/02*    (2006.01)
  *H04S 7/00*    (2006.01)
  *H04M 3/56*    (2006.01)
  *H04N 7/15*    (2006.01)

(52) U.S. Cl.
  CPC .............. *H04S 7/303* (2013.01); *H04M 3/568* (2013.01); *H04N 7/15* (2013.01); *H04S 2400/01* (2013.01); *H04S 2400/15* (2013.01)

(58) Field of Classification Search
  CPC ........ H04S 7/30; H04S 2420/01; H04S 7/302; H04S 2400/15; H04S 7/303; H04S 2400/11; H04S 1/002; H04S 2400/01; H04R 2217/03; H04R 1/20; H04R 5/02; H04N 21/42202; H04N 21/42203
  USPC ....... 381/1, 303, 300, 306, 307, 310, 17–18, 381/77, 120
  See application file for complete search history.

(56) References Cited

U.S. PATENT DOCUMENTS

| 4,608,674 A * | 8/1986 | Guscott .............. G08B 13/1627 340/501 |
| 7,016,504 B1 * | 3/2006 | Shennib .......................... 381/60 |
| 2007/0025555 A1 * | 2/2007 | Gonai et al. .................... 381/17 |
| 2007/0078326 A1 * | 4/2007 | Yoshikawa et al. .......... 600/407 |
| 2008/0232608 A1 * | 9/2008 | Ullmann ........................ 381/77 |
| 2013/0154930 A1 * | 6/2013 | Xiang et al. .................. 345/158 |
| 2013/0190625 A1 * | 7/2013 | Shibamoto et al. .......... 600/447 |

* cited by examiner

*Primary Examiner* — Paul S Kim
*Assistant Examiner* — Norman Yu

(57) ABSTRACT

Embodiments of the invention relate generally to electrical and electronic hardware, computer software, wired and wireless network communications, and wearable/mobile computing devices configured to facilitate production and/or reproduction of spatial audio and/or one or more audio spaces. More specifically, disclosed are systems, components and methods to acoustically determine displacements of audios sources (or portions thereof), such as a subset of speaking users, for providing audio spaces and spatial sound field reproduction, for example, for a remote listener. In one embodiment, a media device includes transducers to emit audible acoustic signals into a region including one or more audio sources, acoustic probe transducers configured to emit ultrasonic signals and acoustic sensors configured to sense received ultrasonic signals reflected from an audio source. A controller can determine a displacement of the audio source. Examples of displacement include locomotion, gesture-related motion and orientation changes.

19 Claims, 13 Drawing Sheets

MOTION DETECTION OF AUDIO SOURCES TO FACILITATE REPRODUCTION OF SPATIAL AUDIO SPACES

CROSS-REFERENCE TO RELATED APPLICATIONS

This application is co-related to U.S. Nonprovisional patent application No. 13/954331 filed Jul. 30, 2013, and entitled "Acoustic Detection of Audio Sources to Facilitate Reproduction of Spatial Audio Spaces," which is herein incorporated by reference in its entirety and for all purposes.

FIELD

Embodiments of the invention relate generally to electrical and electronic hardware, computer software, wired and wireless network communications, and wearable/mobile computing devices configured to facilitate production and/or reproduction of spatial audio and/or one or more audio spaces. More specifically, disclosed are systems, components and methods to acoustically determine displacements of audios sources (or portions thereof), such as a subset of speaking users or listeners, for providing audio spaces and spatial sound field reproduction, for example, for a remote listener.

BACKGROUND

Reproduction of a three-dimensional ("3D") sound of a sound field using loudspeakers is vulnerable to perceptible distortion due to, for example, spectral coloration and other sound-related phenomena. Conventional devices and techniques to generate three-dimensional binaural audio have been generally focused on resolving the issues of cross-talk between left-channel audio and right-channel audio. For example, conventional 3D audio techniques, such as ambiophonics, high-order ambisonics ("HOA"), wavefield synthesis ("WFS"), and the like, have been developed to address 3D audio generation. However, some of the traditional approaches are suboptimal. For example, some of the above-described techniques require additions of spectral coloration, the use of a relatively large number of loudspeakers and/or microphones, and other such limitations. While functional, the traditional devices and solutions to reproducing three-dimensional binaural audio are not well-suited for capturing fully the acoustic effects of the environment associated with, for example, a remote sound field.

Further, there are drawbacks of using traditional three-dimensional binaural audio devices and solutions to reproduce audio originating from an audio source moving within a sound field, and to change the directivity of spatial audio responsive to a displacement of the audio source. One conventional approach, for example, relies on the use of video and/or image detection of the persons to identify audio sources. The capture of images of objects may lead to inadvertent identification of objects to which spatial audio is to be directed. For example, persons viewable through a conference room window may be detected by traditional three-dimensional binaural audio devices and solutions as a recipient of audio, while those persons are not intended to be deemed participants.

Thus, what is needed is a solution for audio capture and reproduction devices without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
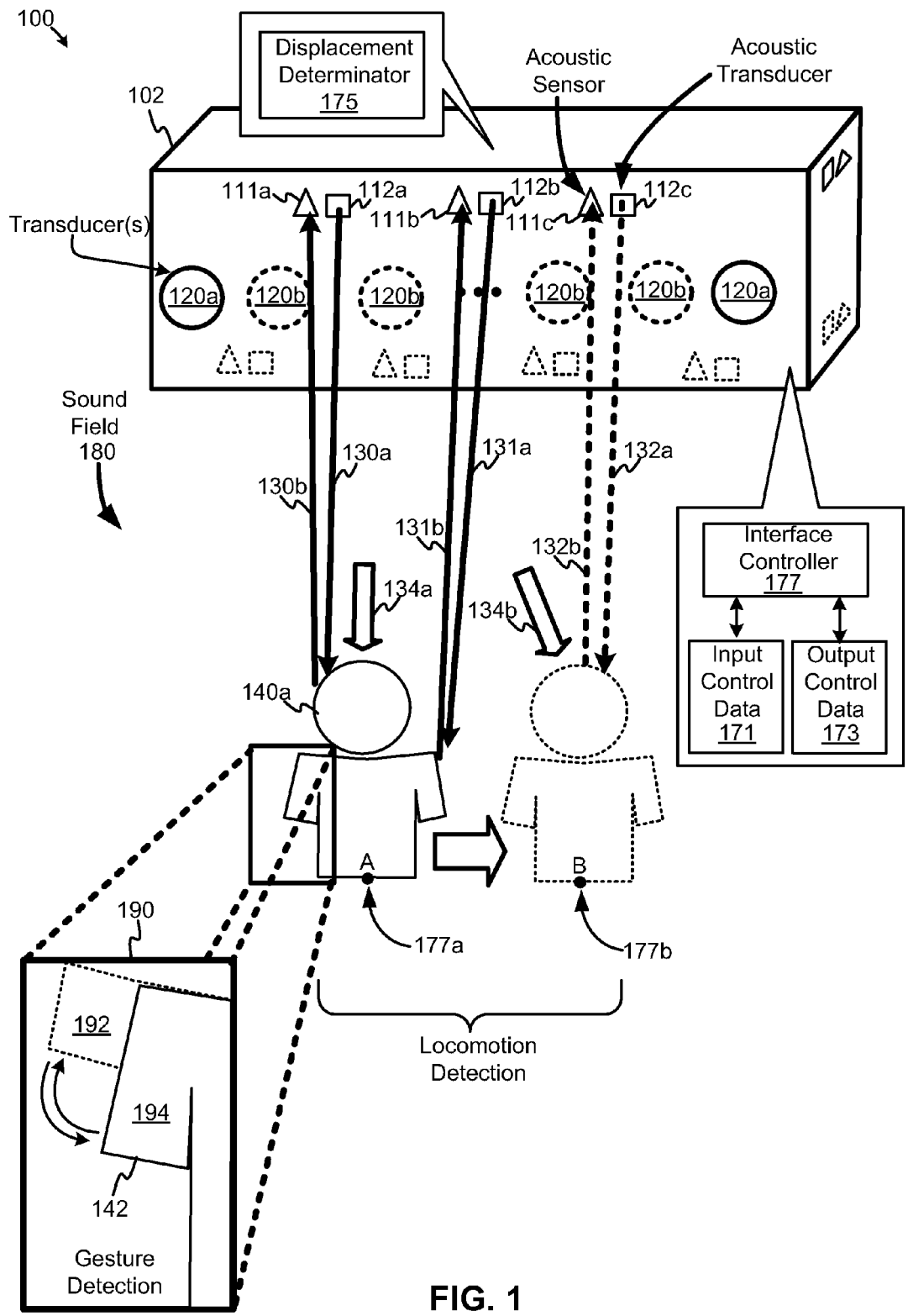
FIG. 1 illustrates an example of a media device configured to detect displacement for facilitating three-dimensional ("3D") audio space generation and/or reproduction, according to some embodiments.

FIG. 1 illustrates an example of a media device configured to detect displacement for facilitating three-dimensional ("3D") audio space generation and/or reproduction, according to some embodiments. Diagram 100 depicts a media device 102 configured to receive audio data (e.g., from a remote source of audio or audio in recorded form stored in a readable media) for presentation as spatial audio to recipient or listener 140a. In some examples, at least two transducers, such as transducers 120a, operating as loudspeakers can generate acoustic signals that can form an impression or a perception at a listener's ears that sounds are coming from audio sources disposed anywhere in a space (e.g., 2D or 3D space) rather than just from the positions of the loudspeakers. Further, media device 102 can be configured to transmit data representing the acoustic effects associated with sound field 180. According to various embodiments, sound field 180 can be reproduced so a remote listener (not shown) can perceive the change of positions or orientations of listener 140a relative, for example, to an audio presentation device at a remote location (or any other reference, such as a point in space that coincides with position of audio presentation device).

In particular, diagram 100 illustrates a media device 102 configured to at least include one or more transducers 120, one or more acoustic transducers 112a, 112b, and 112c, one or more acoustic sensors 111a, 111b, and 111c, a displacement determinator 175, and an interface controller 177. Acoustic transducers 112 are configured to generate acoustic probe signals configured to detect objects or entities, such as audio sources (e.g., listener/vocal speaker 140a), in sound field 180. Acoustic sensors 111 are configured to receive the reflected acoustic probe signals for determining the distance between an object that caused reflection of the acoustic probe signal back to media device 102.

Displacement determinator 175 is configured to determine a displacement of at least a portion of an object based on characteristics of the reflected acoustic probe signals (e.g., reflected ultrasonic signals). In some embodiments, displacement determinator 175 is configured to determine values representative of modified characteristics. Examples of such characteristics include a distance, a direction (e.g., a direction, or an angular direction, such as a vector, defined by an angle relative to a reference line, such as the face of media device 102), and the like. Examples of modified characteristics include a variation in distance, a variation in direction, such as a variation in angle (e.g., changes in angles between two positions), and the like. As such, displacement determinator 175 can use the direction and/or distance of an object, such as an audio source, to calculate, for example, a displacement of listener 140a or a portion thereof. To illustrate, consider that acoustic transducer 112a generates an acoustic probe signal 130a to probe the distance to an object, such as listener 140a. Reflected acoustic probe signal 130b (or a portion thereof) returns, or substantially returns, toward acoustic transducer 112a where it is received by, for example, acoustic sensor 111a. The distance between listener 140a and the face of media device 102 can be determined based on, for example, a time delay between transmission of acoustic probe signal 130a and reception of reflected acoustic probe signal 130b.

In some embodiments, one or more acoustic transducers 112a, 112b, and 112c can generate unique ultrasonic signals as acoustic probes and emit the unique ultrasonic signals in directions from which they are emitted based on the acoustic probe transducer 112a, 112b, or 112c. For example, an acoustic probe signal can include data indicating, for example, the position in space from which it originates (e.g., an identification of acoustic transducer 112a based on its predetermined position relative to any number of acoustic sensors 111a, 111b, and 111c). As such, a surface associated with an object may cause reflected acoustic probe signal 130b to arrive at acoustic sensors 111b and 111c as well as acoustic sensor 111a. Based on time delays associated with reflected acoustic probe signal 130b being received by acoustic sensors (e.g., at different distances relative to acoustic transducer 112a), the distance can be determined as well as orientations of one or more surfaces associated with audio source 140a, such as a face of a listener.

Based on the displacement, locomotion of the listener or audio source 140a can be detected, according to some embodiments. As shown, consider that audio source 140a traverses from point 177a in space to point 177b in space. As audio source 140a moves through sound field 180, acoustic probe signals 130a, 131a, and 132a cause reflected acoustic probe signals 130b, 131b, and 132b to respectively to indicate a distance associated with audio source 140a as the listener transits past corresponding acoustic sensor at different points in time. As used herein, at least in some embodiments, the term "locomotion" can, for example, describe the movement from a position of a predominant portion of an object (or all of an object), whereby movement causes general displacement from a first place or position to a second place or position. Responsive to displacement indicative of locomotion, media device 102 (e.g., including a controller thereof) can be configured to identify an action, and/or cause performance of the action, based on the displacement. An example of performing such an action includes changing directivity of sound beams configured to provide spatial audio. As such, media device 102 can be configured to direct sound beams 134a for providing spatial audio when listener 140a is at point 177a, and further configured to direct sound beams 134b to listener 140a at 177b subsequent to locomotion.

According to some embodiments, displacement of at least a portion of an object, such as listener or audio source 140a, can be detected. Consider that detection of the motion of a portion of the object is desired for various purposes. An example of such a purpose includes implementation of a detected portion as a "gesture," which can be used to provide user input into, or cause modification of operation of, media device 102 or any other device. As shown in diagram 190, a gesture can be detected by motion of an arm 142, or any other appendage, from a first position 192 (and/or a first direction) to a second position 194 (and/or a second direction). As shown, consider that a portion of audio source 140a moves in space (e.g., is transitory) while another portion of audio source 140a is non-transitory or substantially non-transitory. As portion 142 of audio source 140a moves within sound field 180, one or more acoustic probe signals, such as acoustic probe signal 130a can cause reflected acoustic probe signals 130b to indicate a distance and/or direction associated with portion 142 at different points in time. As used herein, at least in some embodiments, the term "gesture" can, for example, describe a movement from a position of, or other motion associated with, a portion of an object, whereby movement causes general displacement from a first position to a second position (e.g., motion detected by changes in position, as detected by ultrasonic acoustic probe or other types of probes, typically relative to a subset of acoustic probe signals associated with one or more surfaces that are relatively stationary or non-transient). Responsive to displacements indicative of a gesture, media device (e.g., including a controller thereof) can be configured to identify an action, and/or cause performance of the action, based on the displacement indicative. An example of performing such an action includes modification of the operation of media device 102. For example, a detected gesture can be translated into a command or data representing a command as a control action. Such a control action can be transmitted to an interface controller 177, which controls inputs and outputs for media device 102. A gesture can translate into input control data 171, which represents received user input, to control operation of media device (e.g., turn media device off, connect a call, modify selection of audio, etc.). Further, a gesture can translate into output control data 173, which represents output directed to a user, such as changes in volume or audio feedback as to operation of media device 102, and the like. As audio source 140a can cause input into media device 102 via gestures, audio feedback can be directed only to audio source 140a (optional) to indicate a state of media device 102 (e.g., the selection of new audio is accepted). Note that arrangements of acoustic transducers and/or acoustic sensors need not be disposed in media device 102, according to some embodiments. The functionality of a controller and acoustic transducers and/or acoustic sensors can be implemented in a separate device that communicates displacement data and position data to media device 102.

Figure 2:
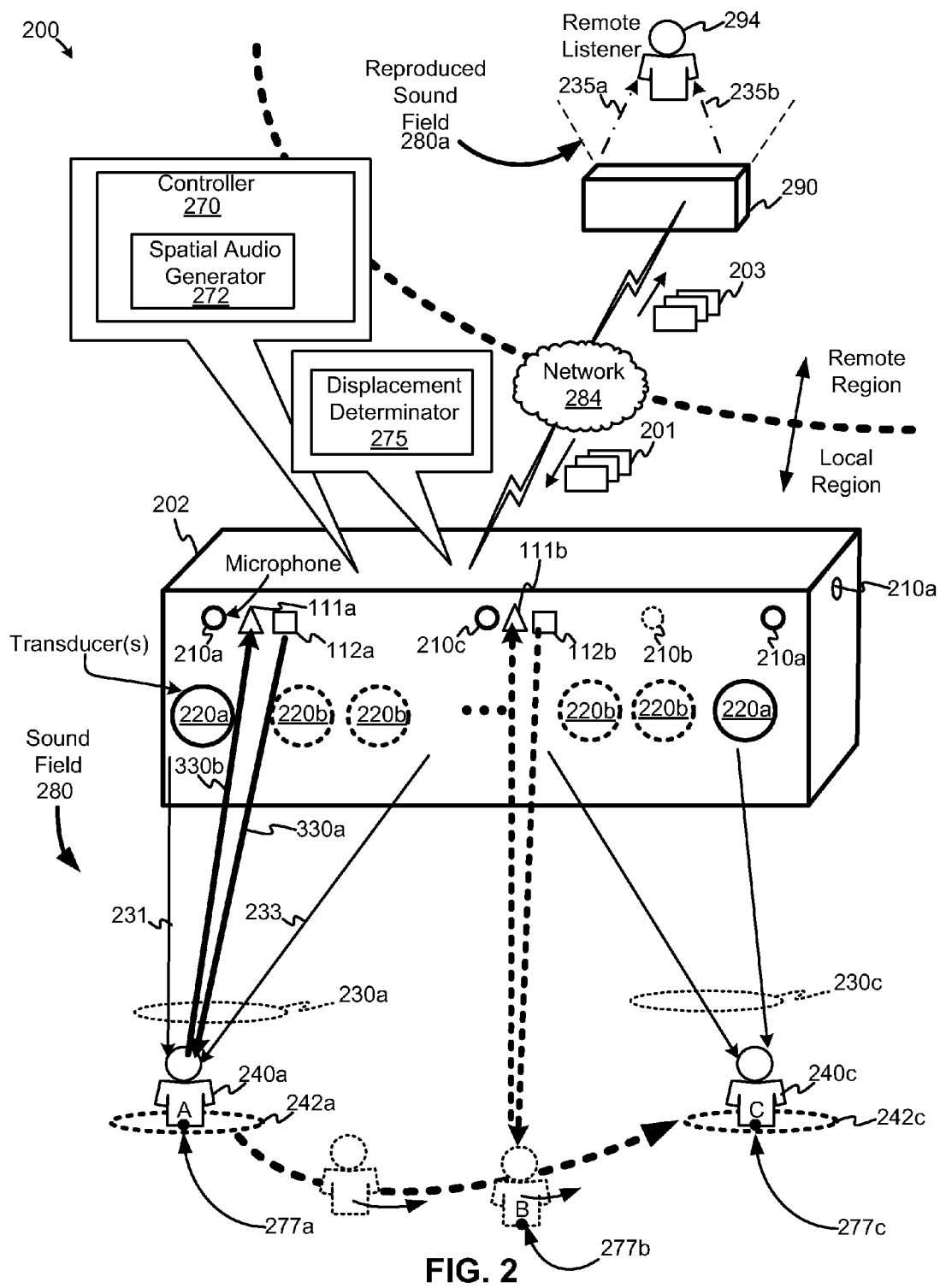
FIG. 2 illustrates an example of a media device configured to detect displacement for modifying directivity of three-dimensional ("3D") audio space generation and/or reproduction, according to some embodiments.

FIG. 2 illustrates an example of a media device configured to detect displacement for modifying directivity of three-dimensional ("3D") audio space generation and/or reproduction, according to some embodiments. Diagram 200 illustrates a media device 202 configured to at least include one or more transducers 220, a controller 270, a displacement determinator 275, and various other components (not shown), such as a communications module for communicating, Wi-Fi signals, Bluetooth® signals, or the like. Media device 202 is configured to receive audio via microphones 210 (e.g., binaural audio) and to produce audio signals and waveforms to produce sound that can be perceived by a listener 240. As shown in diagram 200, controller 270 includes a spatial audio generator 272. In various embodiments, spatial audio generator 272 is configured to generate 2D or 3D spatial audio locally, such as at audio space 242a and/or at audio space 242c, and/or reproduce sound field 280 for presentation to a remote listener 294 as a reproduced sound field 280a. Sound field 280, for example, can include an audio space 242a and an audio space 242c.

According to some embodiments, audio space 242c is formed by modifying the directivity of sound beams 231 and 233 (collectively 230a) used to direct spatial audio to form an audio space 242a for listener 240a by directing sound beams 231 and 233 to form sound beams 230c. As such, spatial audio generator 272 can cause the directivity of audio space 242c to track listener 240a (at a first position) as the listener traverses in sound field 280 from point ("A") 277a to point ("B") 277b, and from point ("B") 277b to point ("C") 277c. Listener 240a is depicted in FIG. 2 as listener 240c (at a second position) after traversing from point 277a to point 277c. Displacement determinator 275 can be configured to determine a displacement of listener 240a to determine a position of listener 240c at point 277c, based on reflected acoustic probe signals 330b and the like. Reflected acoustic probe 330b, which can be received into acoustic sensor 111a, is shown to originate as acoustic probe signal 330a from an acoustic transducer 112a.

Spatial audio generator 272 is configured to receive audio, for example, originating from remote listener 294 (or from a media storing the audio), to generate 2D or 3D spatial audio 230a for transmission to listener 240a. In some embodiments, transducers 220 can generate first sound beam 231 and second sound beam 233 for propagation to the left ear and the right ear, respectively, of listener 240a. Therefore, sound beams 231 and 233 are generated to form an audio space 242a (e.g., a binaural audio space) in which listener 240a perceives the audio as spatial audio 230a.

According to various embodiments, spatial audio generator 272 can generate spatial audio 230a using a subset of spatial audio generation techniques that implement digital signal processors, digital filters, and the like to provide perceptible cues for listener 240a to correlate spatial audio 230a with a perceived position at which the audio source originates. In some embodiments, spatial audio generator 272 is configured to implement a crosstalk cancellation filter (and corresponding filter parameters), or variant thereof, as disclosed in published international patent application WO2012/036912A1, which describes an approach to producing cross-talk cancellation filters to facilitate three-dimensional binaural audio reproduction. In some examples, spatial audio generator 272 includes one or more digital processors and/or one or more digital filters configured to implement a BACCH® digital filter, an audio technology developed by Princeton University of Princeton, N.J. In some examples, spatial audio generator 272 includes one or more digital processors and/or one or more digital filters configured to implement LiveAudio® as developed by AliphCom of San Francisco, Calif.

Transducers 220 cooperate electrically with other components of media device 202, including spatial audio generator 272, to steer or otherwise direct sound beams 231 and 233 to a point in space at which listener 240a resides and/or at which audio space 242a is to be formed. In some embodiments, transducers 220a are sufficient to implement a left loudspeaker and a right loudspeaker to direct sound beam 231 and sound beam 233, respectively, to listener 240a. Further, additional transducers 220b can be implemented along with transducers 220a to form arrays or groups of any number of transducers operable as loudspeakers, whereby groups of transducers need not be aligned in rows and columns and can be arranged and sized differently, according to some embodiments. Transducers 220 can be directed by spatial audio generator 272 to steer or otherwise direct sound beams 231 to specific position or point in space within sound field 280 to form an audio space 242a incident with the location of listener 240a relative to the location of media device 202.

According to various other examples, media device 202 and transducers 220 can be configured to generate spatial audio for any number of audio spaces, such as spatial audio 230a and 230c directed to form audio space 242a and audio space 242c, respectively, which can include a listener traversing from point 277a to point 277c. In some embodiments, spatial audio generator 272 can be configured to generate spatial audio to be perceived at one or more audio spaces 242a and 242c. For example, remote listener 294 can transmit audio that is presented as spatial audio 230a directed to only audio space 242a, whereby other listeners cannot perceive audio 230a as transducers 220 do not propagate audio 230a to other positions, unless listener 240a moves to that new position. Note that while listeners 240a are 240c are described as such (i.e., listeners), such listeners 240a and 240c each can be audio sources, too, and can represent the same audio source at different times after locomotion. In some cases, objects 240a and 240c need not be animate, but can be audio devices.

Displacement determinator 2754 is configured to determine approximate positions, and variations therefrom, of one or more listeners 240 and/or one or more audio spaces 242. By determining approximate displacement of a listeners 240, spatial audio generator 272 can enhance the auditory experience (e.g., perceived spatial audio) of the listeners by adjusting operation of the one or more crosstalk filters and/or by more accurately steering or directing certain sound beams to the listener as the listener, for example, moves around a room including sound field 280. In one implementation, displacement determinator 274 uses information describing the approximate variations in positions of audio spaces 242 located within sound field 280 to determine the location of a listener 240. According to some embodiments, such information can be used by generating acoustic probes that are transmitted into sound field 280 from media device 202 to determine relative distances (e.g., magnitudes of vectors) and directions (e.g., angular displacement of vectors relative to a reference) of audio sources and other aspects of sound field 280, including the dimensions of a room and the like. Examples of acoustic probes and other acoustic-based techniques for determining directions and distances of audio spaces are described hereinafter. Controller 270 provides distances (and variations thereof) and directions (and variations thereof) to spatial audio generator 272 to modify operation of, for example, a cross-talk filer (e.g., angles or directions from speakers to each of a listener's ears) and/or steerable transducers to track directivity of spatial audio toward a listener as he or she moves through sound field 280.

Diagram 200 further depicts media device 202 in communication via one or more networks 284 with a remote audio presentation device 290 at a remote region. Controller 270 can be configured to transmit audio data 203 from media device 202 to remote audio system 290. In some embodiments, audio data 203 includes audio as received by one or more microphones 210 and control data that includes information describing how to form a reproduce sound field 280a. Remote audio system 290 can use the control data to reproduce sound field 280 by generating sound beams 235a and 235b for the right ear and left ear, respectively, of remote listener 294. For example, the control data may include parameters to adjust a crosstalk filter, including but not limited to distances from one or more transducers to an approximate point in space in which a listener's ear is disposed, calculated pressure to be sensed at a listener's ear, time delays, filter coefficients, parameters and/or coefficients for one or more transformation matrices, and various other parameters. The remote listener may perceive audio generated by listener 240a as originating from different positions of audio spaces 242a to 242c relative to, for example, a point in space coinciding with the location of the remote audio system 290. In particular, the remote listener can perceive audio sources moving relative to audio presentation device 290 in reproduced sound field 280a.

In some cases, remote audio system 290 includes logic, structures and/or functionality similar to that of spatial audio generator 272 of media device 202. But in some cases, remote audio system 290 need not include a spatial audio generator. As such, spatial audio generator 272 can generate spatial audio that can be perceived by remote listener 294 regardless of whether remote audio system 290 includes a spatial audio generator. In particular, remote audio system 290, which can provide binaural audio, can use audio data 203 to produce spatial binaural audio via, for example, sound beams 235a and 235b without a spatial audio generator, according to some embodiments.

Further, media device 202 can be configured to receive audio data 201 via network 284 from remote audio system 290. Similar to audio data 203, spatial audio generator 272 of media device 202 can generate spatial audio 230a and 230c by receiving audio from remote audio system 290 and applying control data to reproduce the sound field associated with the remote listener 294 for listener 240. A spatial audio generator (not shown) disposed in remote audio system 290 can generate the control data, which is transmitted as part of audio data 201. In some cases, the spatial audio generator disposed in remote audio system 290 can generate the spatial audio to be presented to listener 240a regardless of whether media device 202 includes spatial audio generator 272. That is, the spatial audio generator disposed in remote audio system 290 can generate the spatial audio in a manner that the spatial effects can be perceived by a listener 240 via any audio presentation system configured to provide binaural audio.

Examples of components or elements of an implementation of media device 200, including those components used to determine proximity of a listener (or audio source), are disclosed in U.S. patent application Ser. No. 13/831,422, entitled "Proximity-Based Control of Media Devices," filed on Mar. 14, 2013 with, which is incorporated herein by reference. In various examples, media device 202 is not limited to presenting audio, but rather can present both visual information, including video (e.g., using a pico-projector digital video projector or the like) or other forms of imagery along with (e.g., synchronized with) audio. According to at least some embodiments, the term "audio space" can refer to a two- or three-dimensional space in which sounds can be perceived by a listener as 2D or 3D spatial audio. The term "audio space" can also refer to a two- or three-dimensional space from which audio originates, whereby an audio source can be co-located in the audio space. For example, a listener can perceive spatial audio in an audio space, and that same audio space (or variant thereof) can be associated with audio generated by the listener, such as during a teleconference. The audio space from which the audio originates can be reproduced at a remote location as part of reproduced sound field 280a. In some cases, the term "audio space" can be used interchangeably with the term "sweet spot." In at least one non-limiting implementation, the size of the sweet spot can range from two to four feet in diameter, whereby a listener can vary its position (i.e., the position of the head and/or ears) and maintain perception of spatial audio. Various examples of microphones that can be implemented as microphones 210a to 210c include directional microphones, omni-directional microphones, cardioid microphones, Blumlein microphones, ORTF stereo microphones, binaural microphones, arrangements of microphones (e.g., similar to Neumann KU 100 binaural microphones or the like), and other types of microphones or microphone systems.

Figure 3:
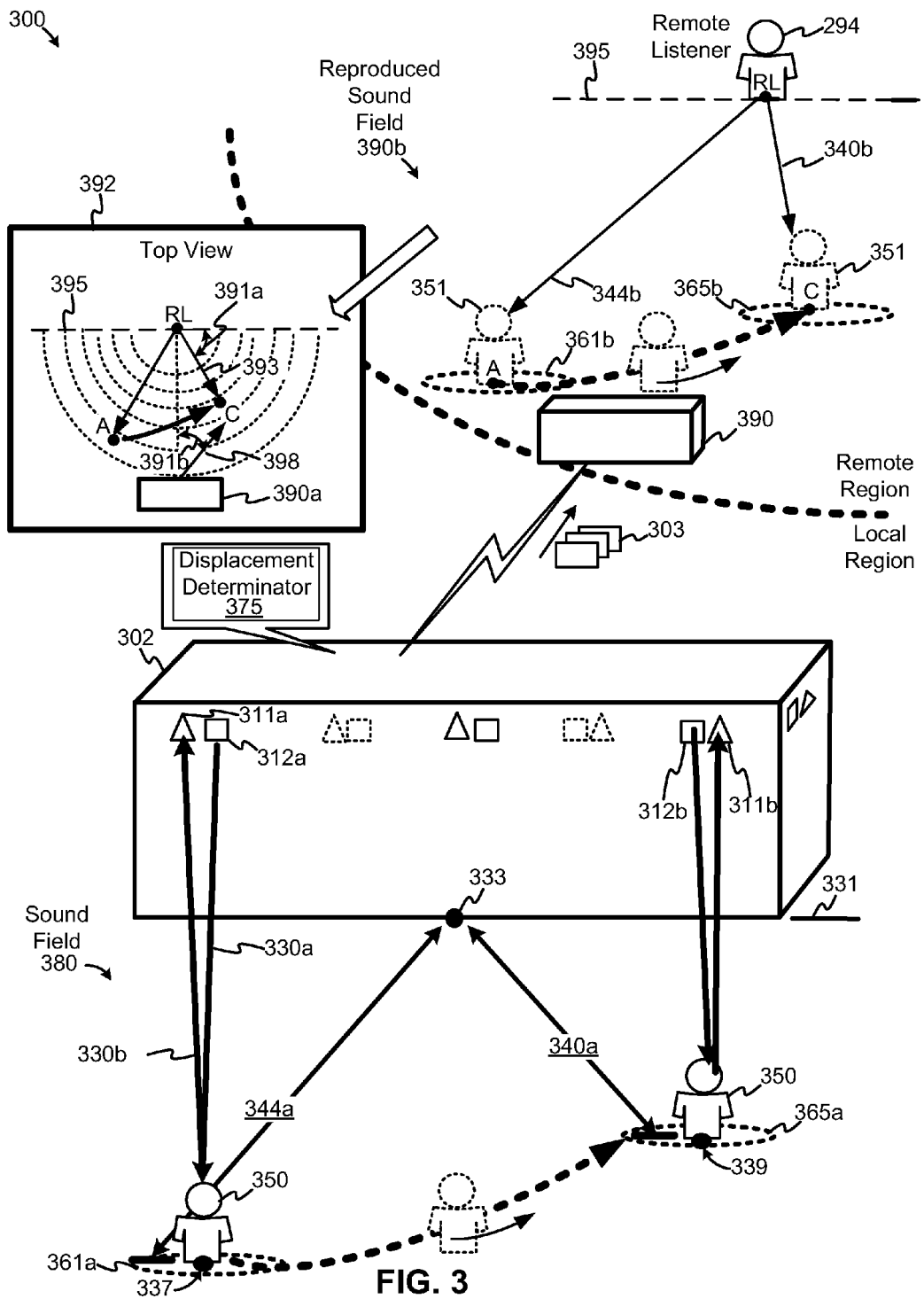
FIG. 3 illustrates an example of a media device configured to determine locomotion of an audio source acoustically to facilitate spatial audio generation and/or reproduction, according to some embodiments.

FIG. 3 illustrates an example of a media device configured to determine locomotion of an audio source acoustically to facilitate spatial audio generation and/or reproduction, according to some embodiments. Diagram 300 depicts a media device 302 including a displacement determinator 375, one or more acoustic transducers 312, and one or more acoustic sensors 311. Acoustic transducers 312a and 312b are configured to generate acoustic probe signals configured to detect locomotion of objects, such as a listener 350, in sound field 380. Acoustic sensors 311a and 311b are configured to receive the reflected acoustic probe signals for determining the distance between the object that caused reflection of the acoustic probe signal back to media device 302. Displacement determinator 375 is configured to determine the variations of direction and/or distance of object to calculate, for example, a position of listener 350 at audio space 361a (e.g., at point 337 in space) at a first point in time and another position of listener 350 at audio space 365a (e.g., at point 339 in space) at a second point in time. To illustrate, consider that acoustic transducer 312a generates an acoustic probe signal 330a to probe the distance to listener 350 at a first point in time. Reflected acoustic probe signal 330b (or a portion thereof) returns, or substantially returns, toward acoustic transducer 312a where it is received by, for example, acoustic sensor 311a. A position determinator (not shown) can determine a distance 344a to audio space 361a (e.g., relative to line 331 coincident with the face of media device 302 or a reference point 333) based on, for example, the time delay between transmission of acoustic probe signal 330a and reception of reflected acoustic probe signal 330b. Similarly, the position determinator can determine a distance 340a to audio space 365a based on, for example, another time delay. Displacement determinator 375 is configured to detect locomotion of listener 350 to determine variations in position (e.g., differences in instantaneous position) and rates in change in position, whereby the variations and rates of change in position can be calculated for adjusting, for example, the directivity of spatial audio responsive to the displacement (e.g., the variations in position).

A spatial audio generator (not shown) of media device 302 is configured to generate spatial audio based on displacement information determined by displacement determinator 375. Data 303 representing spatial audio can be transmitted to remote audio system 390 for generating a reproduced sound field 390b for presentation to a remote listener 294. As shown, audio system 390 uses data 303 to form reproduced sound field 390b in which remote listener 294 perceives audio generated by audio source 350 as originating from a perceived audio source 351 in a position in perceived audio space 361b (point A) at the first point in time (e.g., coinciding with point in time in which listener is disposed at point 337 in sound field 380). That is, audio source 350 is perceived to originate as audio source 351 in audio space 361b at a distance 344b from point RL, which coincides with that location of remote listener 294. Further, audio source 350 can be perceived to originate as audio source 351 in audio space 365b at a distance 340b from point RL after audio source 350 transitions from point 337 (at a first point in time) to point 339 (at a second point in time) in sound field 380.

View 392 depicts a top view of the perceived positions A and C at which perceived audio sources 351 are displaced respectively at audio spaces 361b and 365b relative to point RL (and/or reference line 395). As shown, audio system 390a generates a perceived audio space 365b at point C at a distance 398 from audio system 390a in a direction based on an angle 391b from a line orthogonal to the face of audio system 390a. Remote listener 294, therefore, perceives audio source 350 of audio space 365a (in sound field 380) as being at point C in a direction 393 from point RL. Direction 393 can be determined by an angle 391a relative to line 395. According to some embodiments, a distance can be expressed as a "radius," and a direction can be expressed as an "angle," whereby the distance and direction can be described by in a polar coordinate system, or any other coordinate system.

Figure 4:
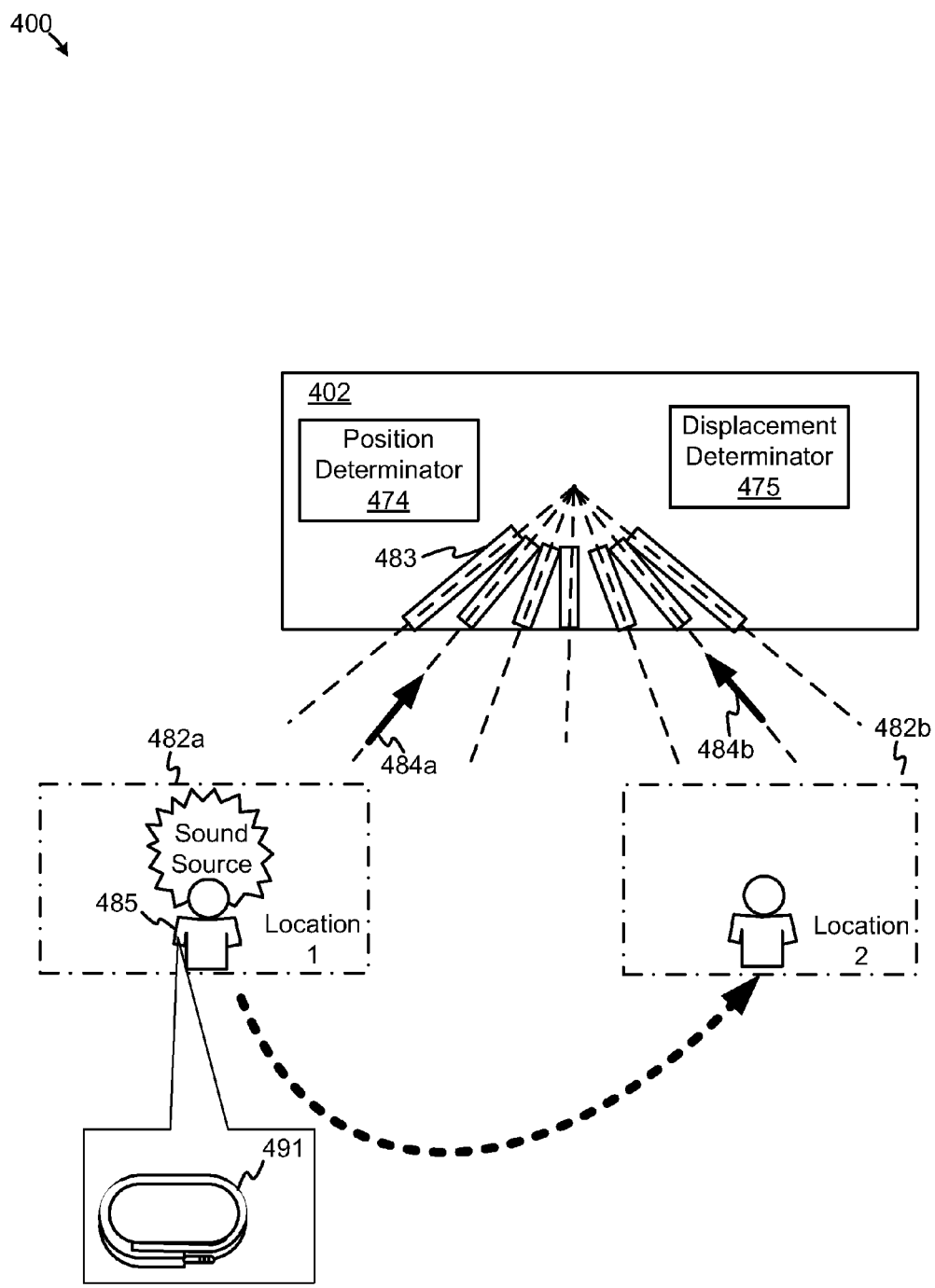
FIG. 4 depicts an example of a media device configured to generate spatial audio based alternative and/or supplemental techniques to determine locomotion and/or one or more positions of an audio source, according to some embodiments.

FIG. 4 depicts an example of a media device configured to generate spatial audio based alternative and/or supplemental techniques to determine locomotion and/or one or more positions of an audio source, according to some embodiments. Diagram 400 depicts a media device 402 including a position determinator 474 configured to determine a position of an audio (or sound) source relative to media device 402. Displacement determinator 475 can be configured to determine variations of position (i.e., motion or movement) of a portion of an audio source. For example, an audio source may be moving an appendage (i.e., a portion of the audio source) to provide a "gesture" with which to modify operation of media device 402. Further, displacement determinator 475 can be configured to determine variations of position of a predominant portion (or all portions) of an audio source. For example, displacement determinator 475 can detect locomotion of an audio source transiting from a first location ("1") 482a to a second location ("2") 482b.

Media device 402 can also include one or more components to determine positions and/or displacements of objects either instead of the use acoustic probe signals or in combination thereof to supplement determinations of positions and/or displacements. As shown, diagram 400 is a top view of a media device 402 an array of microphones as an array of components 183, each microphone being configured to detect or pick-up sounds originating at a location. Position determinator 474 can be configured to receive acoustic signals from each of the microphones or directions from which a sound, such as a vocalized speech sound, originates. For example, a first microphone can be configured to receive sound 484a originating from a sound source at location ("1") 482a, whereas a second microphone can be configured to receive sound 484b originating from a sound source at location ("2") 482b. For example, position determinator 474 and/or displacement determinator 475 can be configured to determine the relative intensities or amplitudes of the sounds received by a subset of microphones and identify the position (e.g., direction or an angle at which the sounds originate) of an audio source based on a corresponding microphone receiving, for example, the greatest amplitude. In some cases, a position can be determined in three-dimensional space. Position determinator 474 and/or displacement determinator 475 can be configured to calculate the delays of a sound received among a subset of microphones relative to each other to determine a point (or an approximate point) from which the sound originates, as well as displacements from the point a particular point in time. Delays can represent farther distances a sound travels before being received by a microphone. By comparing delays and determining the magnitudes of such delays, in, for example, an array of transducers operable as microphones 183, the approximate point from which the sound originates can be determined. In some embodiments, position determinator 474 and/or displacement determinator 475 can be configured to determine the source of sound by using known time-of-flight and/or triangulation techniques and/or algorithms.

According to some embodiments, displacement determinator 475 can be configured to use audio received from one or more microphones 483 to determine approximate changes in positions at which audio spaces traverse within the sound field. For example, acoustic energy (e.g., vocalized speech) originating from audio source 485 generally is of greater amplitude received into a microphone receiving sound 484a, which is at a relatively shorter distance to audio source 485, rather than, for example, the amplitude and time delays associated with the acoustic energy received at a microphone receiving the sound 484b. Also, data representing vocal patterns (e.g., as "speech fingerprints") can be stored in memory (not shown) to be used to match against those individuals who may be speaking in the sound field. An individual whose speech patterns match that of the vocal patterns in memory then can be associated with a certain position or audio space. Therefore, displacement determinator 475 can track changes in position of an identified audio source 485 based on detection of different directions from which the associated vocal patterns originate (e.g., as determined by identifying a microphone from the group of microphones 483 having a greatest amplitude of audio).

In some embodiments, components 483 can be implemented as antennae configured to receive RF signals, whereby position determinator 474 and/or displacement determinator 475 can be configured to use the delays and/or intensities of RF signals to determine a proximity or position for audio source 485. Also, media device 402 can detect various transmissions of electromagnetic waves (e.g., radio frequency ("RF") signals) to determine the relative direction and/or distance of a listener carrying or using a device having a radio, for example, such as a mobile phone. In some cases, the RF signals can be characterized and matched against RF signal signatures (e.g., stored in memory) to identify specific users or listeners (e.g., for purposes of generating individualized audio). In some examples, one or more image capture devices (e.g., configured to capture one or more images in visible light, thermal RF imaging, etc.) can be used to detect audio sources for determining locomotion of a listener.

In alternate implementations, position determinator 474 and/or displacement determinator 475 can be configured to receive position information regarding the position of a listener (or audio source) wearing a wearable device 491. The wearable device can be configured to determine a position of the wearer and position location data (e.g., GPS data, etc.) via any communication channel to media device 202. An example of a suitable wearable device, or a variant thereof, is described in U.S. patent application Ser. No. 13/454,040, which is incorporated herein by reference.

Figure 5A:
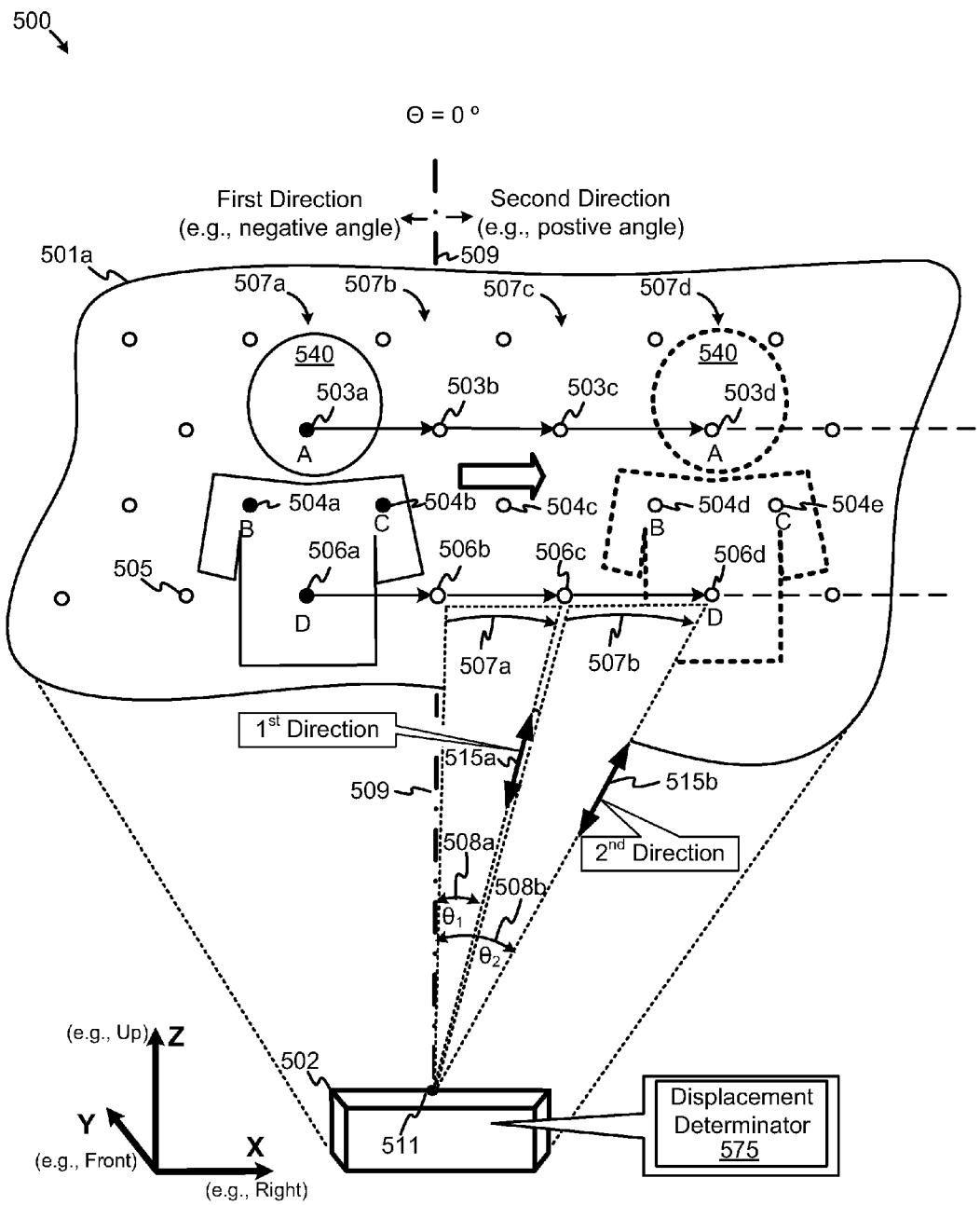
FIGS. 5A to 5C depict examples of determining locomotive displacement and displacement related to gestures and/or orientation changes of an object, according to some embodiments.

FIG. 5A depicts an example of determining locomotive displacement of at least a portion of an object, according to some embodiments. Diagram 500 is a front view of a sound field disposed, for example, in an X-Z plane. Media device 502 of FIG. 5A includes a displacement determinator 575 configured to determine variations of position (i.e., motion or movement) of an audio source or a portion thereof. According to the example shown, media device 502 is configured to introduce acoustic probe signals 505 into a sound field 501a to detect, for example, one or more surfaces associated with an object. As such, a position of an object can be determined with which displacement determinator 575 is configured to detect locomotion of the object, such as an audio source 540 (or listener). Locomotion of an object, such as a listener/audio source, can be determined as the object passes into, and out of, acoustic signals that are projected in a direction (e.g., a predetermined radial direction) from media device 502, for example, or any device external to, but in communication with, media device 502. For purposes of illustration, acoustic probe signals 505 that intercept or otherwise reflect from an object of interest, such as audio source 540, are shown in solid points 503a, 504a, and the like, whereas acoustic probe signals 505 that not reflected from an object of interest are shown as hollow or unfilled points, such as points 506b, 506c, and the like. Acoustic probe signals that generally do not reflect from the object are those signals, such as ultrasonic acoustic probe signals, that propagate nearer or farther than the object of interest (e.g., a probe signal depicted as an unfilled point, such as point 503b, may reflect off a wall of a room at a distance farther than that associated with position 507a of an audio source 540).

In this example, locomotion of audio source 540 is described in terms of variations or changes in position and/or variations or changes in direction. A change or variation in direction (e.g., relative to a reference point 511) can be referred to a change in angle (e.g., relative to a reference line 509) at which a position of one or more surfaces of an object varies over time. In some examples, a variation or change in direction can refer to a variation or change in a lateral direction (regardless of whether the lateral direction is associated with linear or non-linear/arcuate/circumferential motion). A lateral direction can coincide with motion and/or displacement that can be predominantly from one side of a sound field to another side (e.g., substantially associated with or within a plane, such as substantially in an X-Z plane). In some examples, lateral directions can refer to variations in direction (or direction variations), such as variations 507a and 507b of directions.

Displacement determinator 575 can operate in accordance with the following example. A position 507a of an object 540 (e.g., an audio source) can be determined by receiving a subset of reflected acoustic probe signals (e.g., reflected probe signals 503a, 504a, 504b, and 506a) that reflect from one or more surfaces of object 540 at a first point in time. Distances determined from reflected probe signals probe signals 503a, 504a, 504b, and 506a can indicate that the reflected surfaces are at similar distances, or are substantially within a range of distances that specify that the reflected surfaces are associated with object 540. Acoustic transducers that emit acoustic probe signals give rise to reflected signals 503a, 504a, 504b, and 506a, whereby the acoustic probe signals are emitted at known directions (e.g., at known angles relative to reference line 509).

For purposes of discussion, consider that unfilled points may be reflected probe signals probe signals 503b and 506b that indicate large or infinite distances (or any other distance not associated with an objection of interest). At a second point in time, consider that reflected acoustic probe signals 503b, 504c, and 506b indicate a change in distance from the large or infinite distances to distances associated with the above-mentioned range of distances (e.g., distances that related to the object). Also, reflected acoustic probe signals 503a, 504a, and 506a indicate a change of distance from the above-mentioned range of distances to one or more large or infinite distances. Further, reflected acoustic probe signal 504b indicates no change of distance. Responsive to the changes in distances, displacement determinator 575 is configured to identify that object 540 is in a locomotive state in which object 540 varies its position to 507b.

At a third point in time, consider that reflected acoustic probe signals 504c and 504d are reflected from surface portions B and C, respectively, of object 540. Thus, reflected acoustic probe signals 504c and 504d specify the range of distances. Further, consider also that reflected acoustic probe signals 503c and 506c are reflected from surface portions A and D, respectively, of object 540. Thus, reflected acoustic probe signals 503c and 506c specify the range of distances. Note further, that distances associated with reflected acoustic probe signals 503b, 504b, and 506b at the second point in time transitions at the third point in time to large or infinite distances. Responsive to the changes in distances, displacement determinator 575 is configured to identify that object 540 is in a locomotive state in which object 540 varies its position from position 507b to position 507c. In particular, the direction of object 540 varies from a direction substantially parallel to reference line 509 to a first distance 515a, whereby the first direction 515a of object 540 can be associated with angle 508a.

According to some embodiments, displacement determinator 575 can predict the fourth point in time at which object 540 arrives at position 507d. From the third to the fourth points in time, the direction of object 540 varies from the first direction 515a to a second direction 515b. As shown, second direction 515b is at another angle 508b relative to reference line 509. The fourth point of time at which surfaces A, B, C, and D of object 540 are predicted to coincide with a subset of reflected acoustic probe signals 503d, 504d, 504e, and 506d can be determined, for example, by one or more of the rates at which surface A traverses through reflected acoustic probe signals 503a, 503b, and 503c, surface D traverses through reflected acoustic probe signals 506a, 506b, and 503c, and the rates at which surfaces B and C traverses through pairs of reflected acoustic probe signals 504a and 504b, 504b and 504c, and 504c and 504d. According to some embodiments, displacement determinator 575 can determine object 540 is in locomotion by detecting surfaces A, B, C, and D collectively passing through subsets of reflected acoustic probe signals at the same time (or substantially at the same time). According to some embodiments, displacement determinator 575 also can determine object 540 is in locomotion by detecting surfaces A, B, C, and D passing through subsets of reflected acoustic probe signals at the same distance (or at substantially the same distances) from point 511, or at the same or substantially same rate of change in distance (e.g., there is movement toward or away from media device 502). Therefore, displacement determinator 575 can be configured to predict a variation 507b of direction at a fourth point in time (e.g., from direction 515a to direction 515b).

According to some embodiments, displacement determinator 575 can be configured to sense a first subset of reflected acoustic probe signals, as ultrasonic signals, from a subset of surfaces associated with an object 540 at a first time point, and to sense a second subset of reflected ultrasonic signals with object 540 at a second time point. Displacement determinator 575 can be configured to calculate one or more variations of directions between the subset of surfaces at the first time point and the subset of surfaces at the second time point to form one or more calculated direction variations, such as direction variation 507a and 507b. Also, displacement determinator 575 can identify a next position of a portion of object 540 (e.g., including some or all portions of object 540) based on the one or more calculated direction variations that are either in a first lateral direction (e.g., a direction associated with a negative angle) or in a second lateral direction (e.g., a direction associated with a positive angle) relative to point 511 in space. In some examples, the one or more variations of directions can include one or more angles, whereby the one or more calculated direction variations can be either in a negative angular direction (e.g., to the left of reference line 509) or in a positive angular direction (e.g., to the right of reference line 509) relative to point 511 in space. In at least one embodiment, locomotion of an audio source 575 can be determined by movement of each surface of an object (e.g., rather than a subset thereof).

Note that the arrangement, quantity, spacing, patterns, etc. of the directions of emitted acoustic probe signals and/or reflected acoustic probe signals 505 are not limited to the depiction in diagram 500, as well as in other diagrams shown herewith. According to various embodiments, fewer or more reflected acoustic probe signals 505 can be implemented in a variety of other arrangements, quantities, patterns, and the like. Further, emitted acoustic probe signals can each originate from individual acoustic transducers, or a subset of emitted acoustic probe signals can originate from an individual acoustic transducer (e.g., a mechanism can be configured to deflect an emitted acoustic probe signal to different points in a sound field, or an acoustic transducer can be oriented to direct emitted acoustic probe signals to different points in space).

Figure 5B:
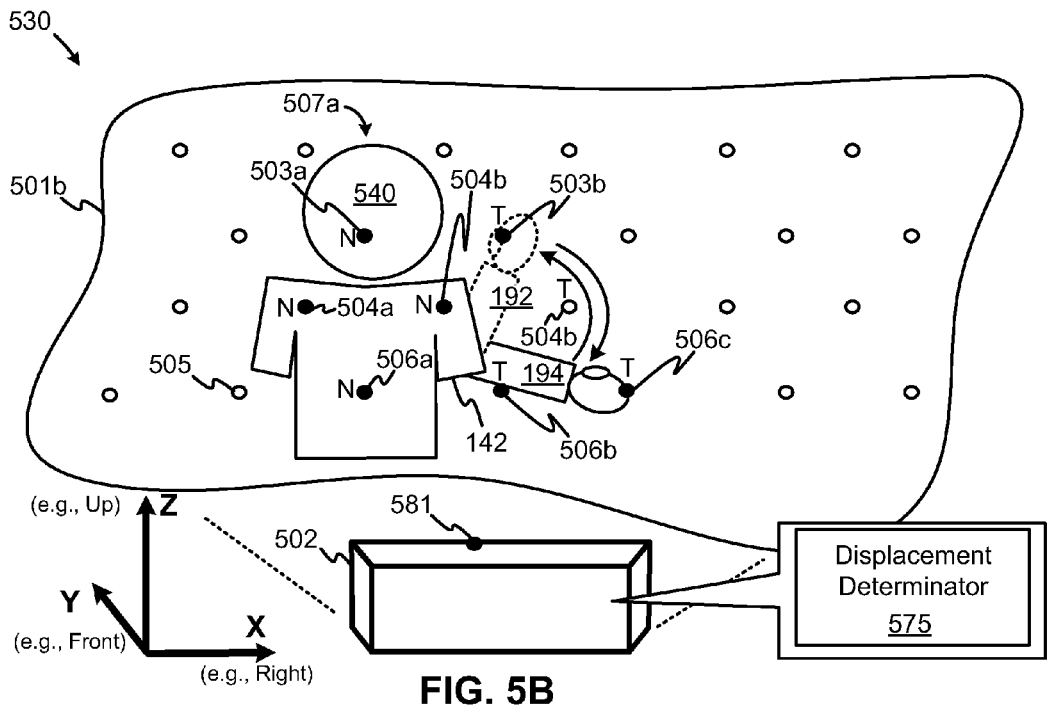

FIG. 5B is a front view that depicts an example of detecting gestures based on displacement of at least a portion of an object, according to some embodiments. Diagram 530 is a front view of a sound field in which acoustic probe signals 505 are emitted into a sound field 501b. Unfilled points represent emitted acoustic probe signals 505 that are not reflected, or if so, are associated with a relatively large distance (e.g., distance) or any other distance not associated with an objection of interest. Media device 502 of FIG. 5B includes a displacement determinator 575 configured to determine variations of position (i.e., motion or movement) of a portion of an audio source 540. In various embodiments, displacement determinator 575 can be configured to perform or otherwise contribute to a determination as to whether a portion of audio source 540 is associated with a gesture (e.g., based on variations of the position audio source 540).

According to some embodiments, a gesture can be determined based on a subset of reflected acoustic probe signals that is associated with varying characteristics relative to another subset of reflected acoustic probe signals that is associated with non-varying characteristics. To illustrate, consider that an object, such as audio source 540, is located at position 507a of FIG. 5B. In this example, displacement determinator 575 can be configured to determine that at least one subset of reflected acoustic probe signals 503a, 504a, 504b, and 506a indicate that corresponding surfaces of object 540 are non-transitory ("N"). According to some embodiments, acoustic probe signals that are associated with non-transitory ("N") surfaces can indicate that surfaces of an object are substantially non-transitory (e.g., within a range of motion that are non-transitory). Further, displacement determinator 575 can be configured to determine that at least another subset of reflected acoustic probe signals are associated with transitory one or more surfaces. In some embodiments, the term "non-transitory" can refer to one or more one or more surfaces that generally remain stationary relative to, for example, a reference point 581.

To illustrate operation of displacement determinator 575, consider that displacement determinator 575 can be configured to determine that reflected acoustic probe signals 503a, 504a, 504b, and 506a indicate surfaces of object 540 are non-transitory ("N") and that reflected acoustic probe signals 503b, 504b, 506c, and 506b are transitory ("T"). In this example, reflected acoustic probe signals 503b, 504b, 506c, and 506b indicate that one or more surface of an object, such as audio source, are in motion (e.g., relative to other portions of the object). As shown, a position of a participant in a teleconference, such as audio source 540, can be detected in a sound field relative to media device 502. The body of the participant can be determined to be non-transitory based on reflected acoustic probe signals 503a, 504a, 504b, and 506a.

An appendage or other body portions of the participant can be in motion relative to the body. As shown, reflected acoustic probe signals 503b, 504b, 506c, and 506b can vary between a distance associated with the body of the participant and other distances (e.g., an infinite distance). As such, displacement determinator 575 can determine that the displacement of an arm of a participant can be associated with a pattern of motion that can be a "gesture," at least in some cases. Such gestures can indicate a participant's desire to modify operation of media device 502.

Figure 5C:
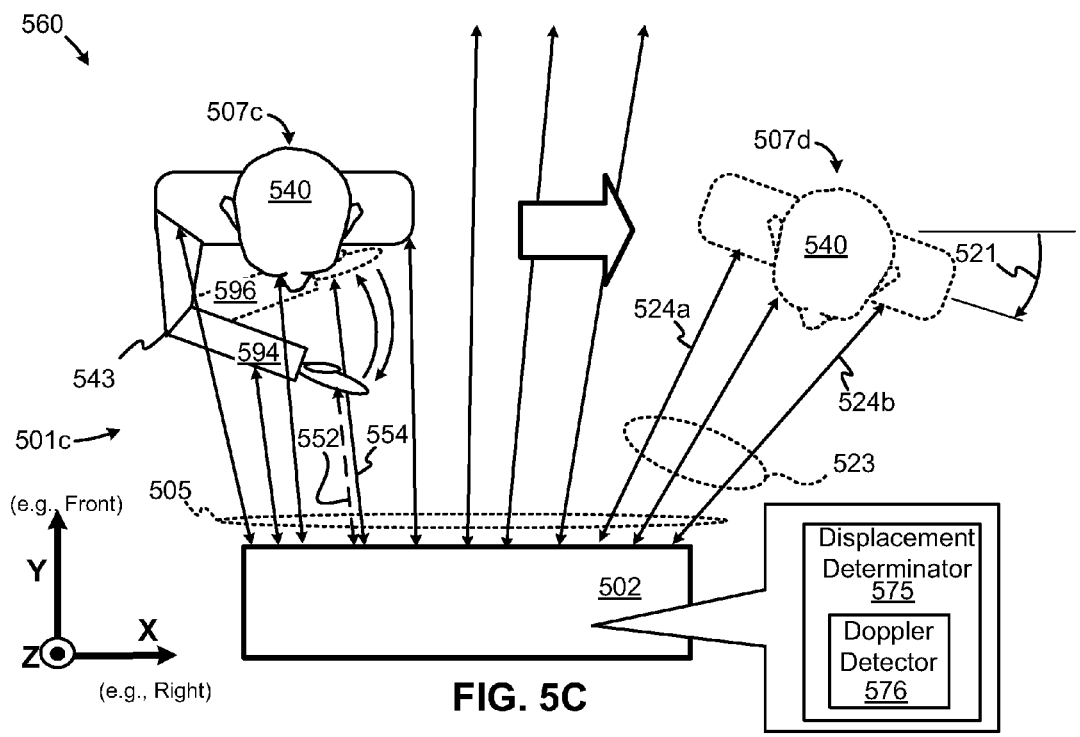

FIG. 5C is a top view that depicts an example of detecting gestures based on displacement of at least a portion of an object, according to some embodiments. Diagram 560 is a top view of a sound field in which emitted and reflected acoustic probe signals 505 associated with a sound field 501c. In the example shown, a portion of a participant is transitory relative to another portion of an object, such as audio source 540 of FIG. 5C. Media device 502 of FIG. 5B includes a displacement determinator 575 configured to determine variations of position (i.e., motion or movement) of a portion of an audio source 540.

In various embodiments, displacement determinator 575 can be configured to perform or otherwise contribute to a determination as to whether a portion of audio source 540 is associated with a gesture (e.g., based on variations of the position audio source 540). As shown, audio source 540 is disposed at position 507c at a first point in time. In this example, the participant is moving its arm 543 between at least two positions 596 and 596. Arm 543 of the participant is shown to move in the X-Y plane in a back-and-forth motion, whereby a distance between arm 543 and media device 502 varies. At a first point in time, an acoustic transducer emits an acoustic probe signal, which is reflected from arm 543 (at position 594) as reflected acoustic probe signal 552. At a second point in time, the acoustic transducer emits an acoustic probe signal, which is reflected from arm 543 (at position 596) as reflected acoustic probe signal 554. The variation in position of the one or more surfaces of arm 543 over various points of time. A gesture detector (not shown) can be configured to determine whether the variations of position of the portion of the object 540 constitute a gesture.

FIG. 5C also depicts locomotion, and/or changes in orientation, as detected by a displacement. As shown, displacement determinator 575 can determine the changes of position of audio source 540 from position 507c to position 507d. Further, displacement determinator 575 can be configured to changes in orientation of an object, such as a change in orientation of a body, face or other portion of a participant. In the example shown, emitted and/or reflected acoustic probe signals 523 can be used to determine that reflected acoustic probe signal 524a varies less in distance than reflected acoustic probe signal 524b. As reflected acoustic probe signals 523 are generally in a range of distances indicating that one or more surfaces are associated with an object, variations of distances determined by reflected acoustic probe signals 524a and 524b can be used to determine that audio source 540 has changed an orientation by an angle 521.

In some embodiments, displacement determinator 575 can include a Doppler detector 576 to determine distances and variations thereof. Doppler detector 576 can be configured to determine Doppler shifts of acoustic signals (e.g., ultrasonic, audible, or any other type of sound wave signal) to determine distances and rates of change of distances for one or more surfaces from which acoustic signals are reflected. To identify movement, Doppler detector 576 can determine movement caused by a Doppler shift a emitted and/or reflected acoustic probe signal. In some embodiments, emitted and/or reflected acoustic probe signals include emitted and/or reflected ultrasonic acoustic signals modulated, for example, in accordance with phase-shifted key ("PSK") modulation. For example, PSK-modulated acoustic probe signals can be modulated with unique pseudo-random sequences for one or more individual PSK signals transmitted for a corresponding ultrasonic transducer. Doppler shifts of PSK-modulated signals can be determined to identify movements and variations of position to determine either locomotion or gestures, or both. Note that variations in motion, such as gestures, can be determined by motion in any number of planes, such as motion (e.g., rotating motion) that varies in each of the X, Y, and Z planes. Further, the unique probe signals (e.g., unique PSK signals) can also include identifiers that indicate which media device the signal originated from, the particular acoustic transducer from which it was emitted (which enables a media device to derive geometric information), a time at which the PSK signal was transmitted, and any other information to determine time of flight, and other signal characteristics for determining distances and/or directions.

Figure 6A:
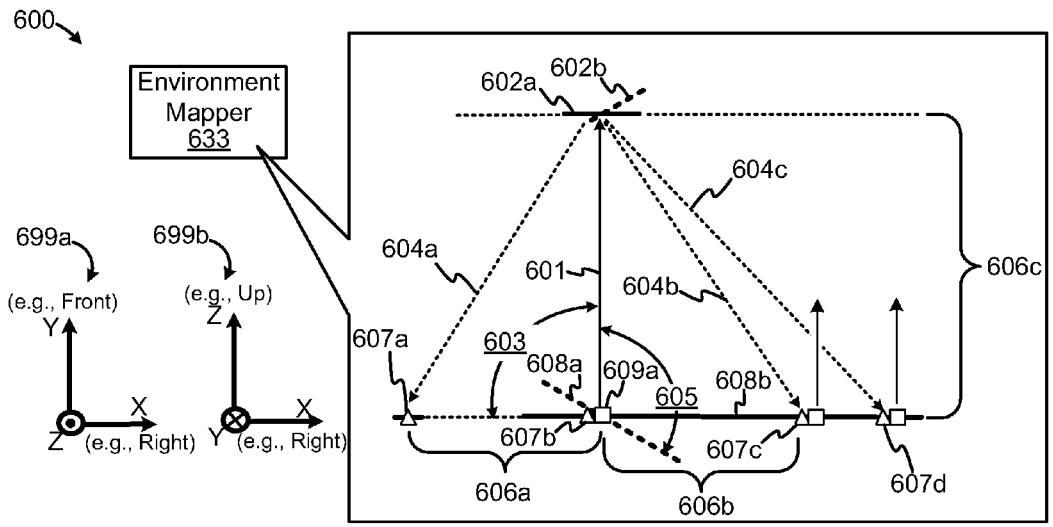
FIGS. 6A to 6D depict an environment mapper configured to map positions of one or more surfaces disposed in a sound field, according to some embodiments.

FIGS. 6A to 6D depict an environment mapper configured to map positions of one or more surfaces disposed in a sound field, according to some embodiments. Diagram 600 of FIG. 6A depicts an environment mapper 633 configured to map or otherwise determine spatial characteristics of surfaces in which a media device or an array of acoustic transducers (which can be disposed in a housing separate from the media device) are disposed. By determining the spatial characteristics of surfaces in an environment (or sound field), a media device can be configured to provide audio that is compensated for environmental influences, such as the dimensions and relative positions of the surfaces of a room. In some embodiments, environment mapper 633 can be configured to detect relatively immobile surfaces, such as a ceiling, a wall, a window, or the like. As such, environment mapper 633 can be configured to determine spatial characteristics as shown in diagram 600. For example, consider that an acoustic transducer 609a emits an acoustic probe signal 601 that impinges upon a surface 602 (e.g., surface 602a, 602b, or other surfaces). Environment mapper 633 can determine, for example, an angle at which acoustic probe signal 601 is emitted. In one case, acoustic transducer 609a can emit acoustic probe signal 601 at an angle 603 relative to a line 608b coincident with a surface of a media device (e.g., a front surface) or with an arrangement of acoustic sensors 607 (e.g., acoustic sensors 607a, 607b, 607c, and 607d). In this configuration, a reflected acoustic probe signal can be received into acoustic sensor 607b when surface 602 is parallel (e.g., surface 602a), as an example, with surface 608b. Further, a distance 606c can be determined by the reflected acoustic probe signal 601 received into acoustic sensor 607b, based on time delays, among other signal characteristics.

In another case, acoustic transducer 609a can emit acoustic probe signal 601 at any other angle 605 with a line 608a coincident with another surface that can include a front surface of a media device or another arrangement of acoustic sensors (not shown). Next, consider that reflected surface is surface 602b. Therefore, acoustic probe signal 601 can reflect from surface 602b toward acoustic sensor 607c, which is located at a distance 606b from acoustic transducer 609a, and sensor 607d. The delays between reflected acoustic probe signals 604b and 604c can be used to determine the general distance 606c and/or orientation of surface 602. As another example, reflected acoustic probe signal 604a can be received into sensor 607a at a certain point in time. Based on the time at which the acoustic probe signal 601 was emitted and received into a specific sensor 607a (among others), and based on distance 606a, the distance to surface 602a and orientation of the media device (or the orientation of the arrangement of sensors 607) can be determined. Note that acoustic transducer 609a can be configured to determine a distance to, or a spatial characteristic, of an obstruction, such as a ceiling, if oriented in accordance with a coordinate system 699b, or a front wall, if oriented in accordance with a coordinate system 699a.

In some embodiments, environment mapper 633 can be configured to operate at different times during operation of a media device. For example, environment mapper 633 can operate at start-up (or when power is applied) to determine the spatial characteristics of a room. As another example, environment mapper 633 can operate at different times during operation of a media device, such as periodically or responsive to one or more events. An example of such an event is movement or motion of a media device. For instance, if a user re-orientates the media device (or arrangement of acoustic transducers and sensors) based on motion sensor data, such as accelerometer data, environment mapper 633 can operate to re-map or re-characterize the dimensions of an environment, such as the room dimensions. Environment mapper 633 can also determine spatial characteristics (e.g., in terms of direction, distance, etc.) for any object, such a wall, an audio source, furniture, etc.

A spatial audio generator (not shown) can implement the values of the distances and other spatial characteristics, as determined by environment mapper 633, to adjust the generation of spatial audio to compensate for the environment. As environment mapper 633 can map acoustic paths (e.g., using ultrasonic signals), it can determine paths of audible audio signals. Therefore, audible spatial audio signals can be adjusted to compensate for surfaces of the environment that may otherwise cause reflections therefrom, as characterized by environment mapper 633. The spatial audio generator can compensate for reflections of audible audio from surfaces, such as walls, to optimize formation of audio spaces that provide 2D or 3D spatial audio.

Figure 6B:
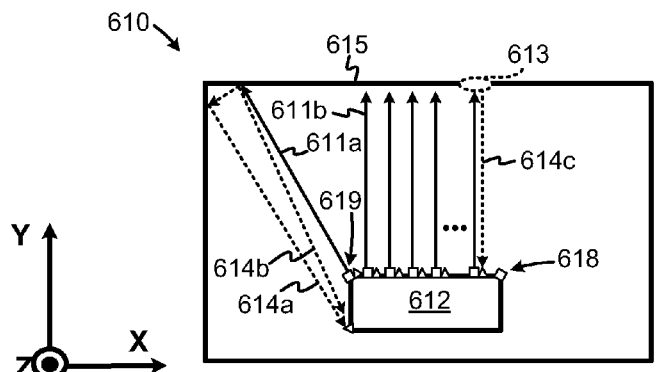

FIG. 6B depicts an example of an environment characterized by an environment mapper, according to some embodiments. In some embodiments, a media device 612 can include one or more arrangements of acoustic transducers and acoustic sensors. A subset of an arrangement 618 of acoustic transducers can be configured to emit acoustic probe signals 611 to surfaces 613, which can reflect the acoustic probe signal as reflected acoustic probe signal 614c. In one implementation, an acoustic transducer 619 can be configured or otherwise oriented to direct an acoustic probe signal 611a to detect surfaces of room 615 at angle relative to other signals generated by one or more other acoustic transducers. For example, acoustic probe signal 611a can be reflected as reflected acoustic probe signal 614a or reflected acoustic probe signal 614b. In this example, acoustic probe signal 611a can determine, for example, one or two difference surfaces from which reflections propagate. As shown, acoustic probe signal 611a is reflected to the left of the emitting acoustic transducer.

Figure 6C:
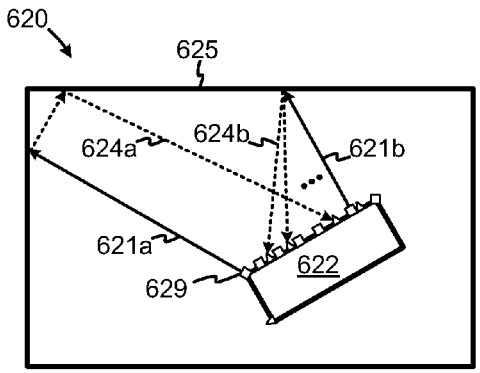

FIG. 6C depicts another example of an environment characterized by a re-oriented environment mapper, according to some embodiments. In the example shown, acoustic transducer 629 can emit a probe signal 621a that is reflected back as reflected probe signal 624a, which reflects back to media device 622 to the right of acoustic transducer 629.

Also, probe signal 621b can reflect back as reflected probe signal 624b, which reflects back to media device 622 to the left of the acoustic transducer that generated probe signal 621b. Based on the geometries of the paths over with the acoustic probes propagate, an environment mapper can determine orientation of media device 622 and/or the dimensions of room 625.

Figure 6D:
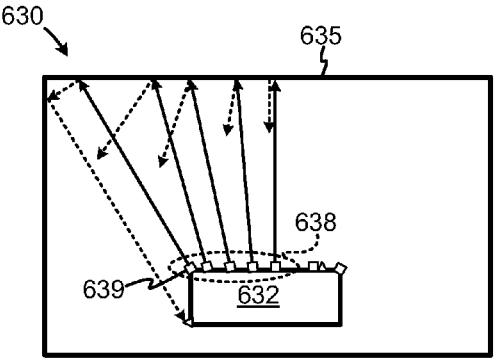

FIG. 6D depicts another example of an arrangement of acoustic transducers, according to some embodiments. In the example shown, an arrangement 638 of acoustic transducers can be configured to generate probe signals at different angles (e.g., relative to a line orthogonal to a surface of media device 632). In this case, acoustic transducer 639 can emit a probe signal that is reflected back as reflected probe signal to the left of acoustic transducer 639. According to various embodiments, acoustic transducers and/or acoustic sensors can be oriented in any direction to transmit and/or receive acoustic probe signals.

Figure 7:
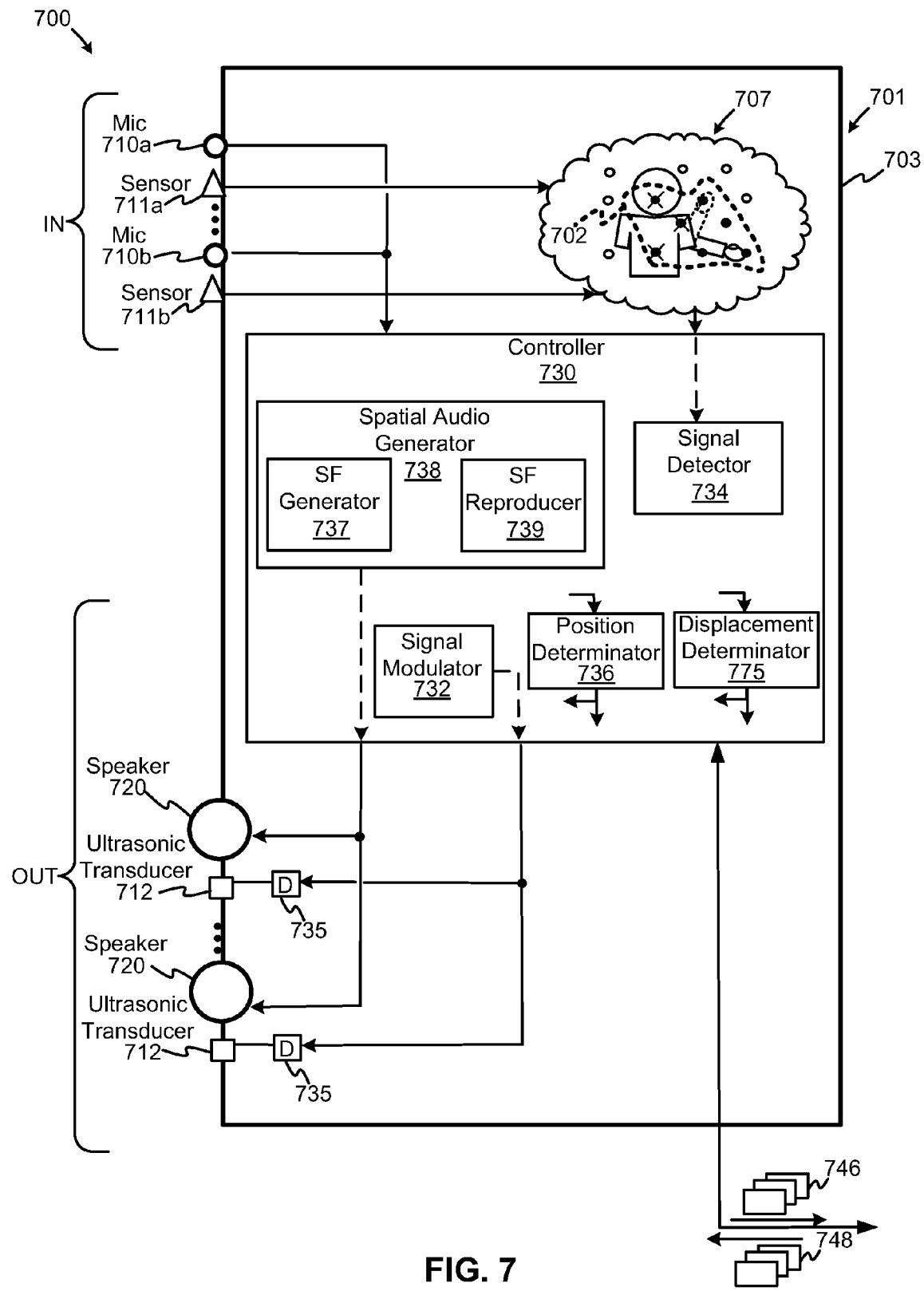
FIG. 7 depicts an example of a media device configured to generate spatial audio based on ultrasonic probe signals, according to some embodiments.

FIG. 7 depicts an example of a media device configured to generate spatial audio based on ultrasonic probe signals, according to some embodiments. Diagram 700 depicts a media device 701 including a housing 703, one or more microphones ("Mic") 710, one or more ultrasonic sensors ("sensor") 711, one or more transducers, such as loudspeakers ("Speaker") 720, and one or more acoustic probe transducers, such as ultrasonic transducers 712. Diagram 700 is intended to depict components schematically in which acoustic signals ("IN") enter media device 701, whereas other components are associated with acoustic signals ("OUT") that exit media device 701. Depicted locations of microphones 710, sensors 711, speakers 720, and transducers 712 are explanation purposes and do not limit their placement in housing 703. Thus, loudspeakers 720 are configured to emit audible acoustic signals into a region external to housing 701, whereas acoustic probe transducers can be configured to emit ultrasonic signals external to housing 701 to detect a position (or a variation thereof) of, or a distance (or a variation thereof) to, one or more audio sources, such as listeners. Controller 730 can be configured to determine a position of at least one audio source, such as a listener, in a sound field, based on one or more reflected acoustic probe signals received by one or more ultrasonic sensors 711. Further to diagram 700, ultrasonic transducer 712 can be driven by driver ("D") 735 that can be modulated by signal modulator 732. In some embodiments, ultrasonic transducer 712 is a piezoelectric transducer.

As shown further in diagram 700, controller 730 includes a signal modulator 732, a signal detector 734, a spatial audio generator 738, a position determinator 736, and a displacement determinator 775. Signal modulator 732 is configured to modulate one or more ultrasonic signals to form multiple acoustic probe signals for probing distances (and/or locations) relative to one or more audio sources and/or entities in a sound field. In some embodiments, signal modulator 732 is configured to generate unique modulated ultrasonic signals for transmission from different ultrasonic transducers 712. Since each unique modulated ultrasonic signal is transmitted from a specific corresponding ultrasonic transducer 712, a direction of transmission of the unique modulated ultrasonic signal is known based on, for example, the orientation of ultrasonic transducer 712. With a direction generally known, the delay in receiving the reflected unique modulated ultrasonic signal provides a basis from which to determine a distance. Signal detector 734 is configured to identify one or more reflected modulated ultrasonic signals 702 received into one or more sensors 711. In some embodiments, signal detector 734 is configured to monitor multiple modulated ultrasonic signals 707 (e.g., concurrently) to isolate various temporal and spatial responses to facilitate determination of one or more positions of one or more audio sources.

Position determinator 736 can be configured to determine a position of an audio source and/or an entity in the sound field by, for example, first detecting a particular modulated ultrasonic signal having a particular direction, and then calculating a distance to the audio source or entity based on calculated delay. Spatial audio generator 738 is configured to generate spatial audio based on, for example, audio received from microphones 710 for transmission as audio data 746, which is destined for presentation at a remote audio system. Further, spatial audio generator 738 can receive audio data 748 from a remote location (or a recorded medium, such as a DVD, etc.) that represent spatial audio for presentation to a local sound field. As such, spatial audio can be transmitted via speakers 720 (e.g., arrays of transducers, such as those formed in a phase-arrayed transducer arrangements) to generate sound beams for creating spatial audio and one or more audio spaces.

In some examples, spatial audio generator 738 may optionally include a sound field ("SF") generator 737 and/or a sound field ("SF") reproducer 739. Sound field generator 737 can generate spatial audio based on audio received from microphones 710, whereby the spatial audio is transmitted as audio data 746 to a remote location. Sound field reproducer 739 can receive audio data 748, which can include control data (e.g., including spatial filter parameters for a cross-talk cancellation filter and other circuitry), for converting audio received from a remote location or a recorded medium into spatial audio for transmission through speakers 720 to local listeners. Regardless, audio data representing spatial audio originating from remote location can be combined at controller 730 with modulated ultrasonic signals for transmission over at least a portion 747 of a common, shared path.

Displacement determinator 775 can be configured to use the direction and/or distance of an object, as determined by position determinator 736, to calculate, for example, a displacement of a listener or a portion thereof. Displacement determinator 775 can be configured to calculate one or more variations of directions between subsets of surfaces at a first time point and subsets of surfaces at a second time point to identify one or more calculated direction variations. Also, displacement determinator 775 can predict a next position of a portion of an object based on the one or more calculated direction variations. In some examples, the one or more variations of directions can include one or more angles, whereby the one or more calculated direction variations can be described as angular directions.

In view of the foregoing, the functions and/or structures of media device 701, as well as its components, can facilitate the determination of positions and displacements of audio sources (e.g., listeners) using acoustic techniques, thereby effectively employing acoustic-related components to determine movements of listeners in a sound field, including gestures that be interpreted into user input to modify operation of media device 701 (e.g., to change volume, to begin or to end a teleconference, to change music selections, etc.).

In some embodiments, media device 701 can be in communication (e.g., wired or wirelessly) with a mobile device, such as a mobile phone or computing device. In some cases, such a mobile device, or any networked computing device (not shown) in communication with media device 701, can provide at least some of the structures and/or functions of any of the features described herein. As depicted in FIG. 7 and subsequent figures (or preceding figures), the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in FIG. 7 (or any figure) can represent one or more algorithms. Or, at least one of the elements can represent a portion of logic including a portion of hardware configured to provide constituent structures and/or functionalities.

For example, controller 730 and any of its one or more components, such as signal modulator 732, signal detector 734, spatial audio generator 738, position determinator 736, and displacement determinator 775 can be implemented in one or more computing devices (i.e., any audio-producing device, such as desktop audio system (e.g., a Jambox® implementing LiveAudio® or a variant thereof), mobile computing device, such as a wearable device or mobile phone (whether worn or carried), that include one or more processors configured to execute one or more algorithms in memory. Thus, at least some of the elements in FIG. 7 (or any figure) can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, controller 730 and any of its one or more components, such as signal modulator 732, signal detector 734, spatial audio generator 738, position determinator 736, and displacement determinator 775 can be implemented in one or more computing devices that include one or more circuits. Thus, at least one of the elements in FIG. 7 (or any figure) can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Figure 8:
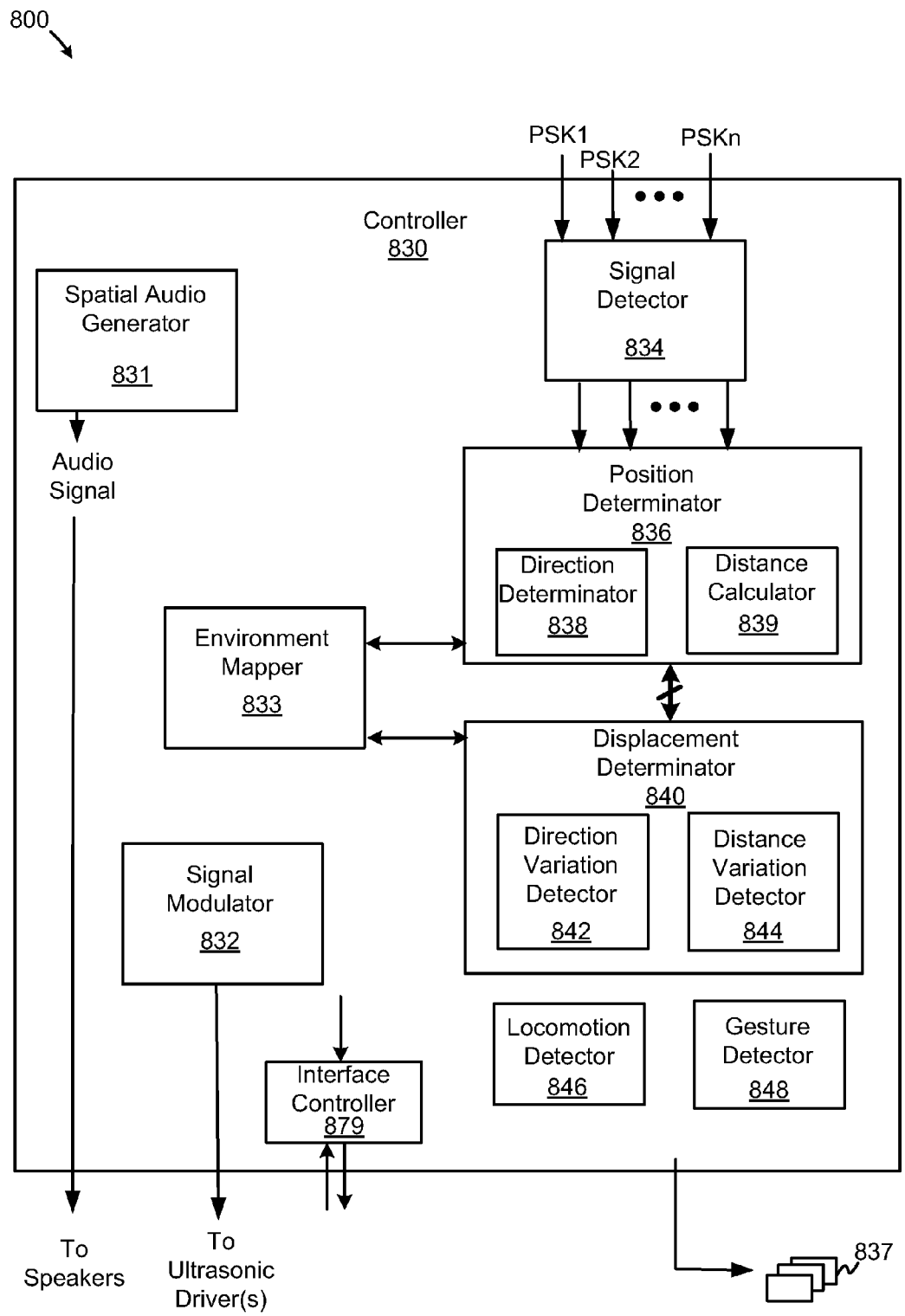
FIG. 8 depicts a controller including a signal modulator operable to generate pseudo-random key-based signals, according to some embodiments.

FIG. 8 depicts a controller including a signal modulator operable to generate pseudo-random key-based signals, according to some embodiments. Controller 830 is shown to include a spatial audio generator 831, a signal modulator 832, a signal detector 834, and a position determinator 836. In some embodiments, spatial audio generator 831 provides data representing spatial audio for combination with one or more modulated ultrasonic signals generated by signal modulator 832. In some embodiments, signal modulator 832 is configured to generate phase-shifted key ("PSK") signals modulated with unique pseudo-random sequences for one or more individual PSK signals transmitted for a corresponding ultrasonic transducer. Thus, signal modulator 832 can generate unique ultrasonic signals, with at least one unique ultrasonic signal being generated for emission from a corresponding acoustic probe transducer. In some examples, the unique ultrasonic signal is emitted in a direction associated with an orientation of an acoustic probe transducer. The orientation can form a basis from which to determine a direction.

Ultrasonic sensors can sense reflected modulated ultrasonic signals from one or more surfaces, a subset of the surfaces being associated with an audio source (e.g., a listener). The reflected unique pseudo-random sequences for one or more individual PSK signals, depicted as "PSK1," "PSK2," . . . , and "PSKn," can be received from the ultrasonic sensors and provided to signal detector 834. In some examples, signal detector 834 can be tuned (e.g., variably tuned) to different pseudo-random sequences to provide multiple detection of different pseudo-random sequences, wherein the detection of pseudo-random sequences of PSK1, PSK2, and PSKn can be in parallel (or in some cases, in series). In some embodiments, signal detector 834 can be configured to operate to multiply received signals by an expected pseudo-random sequence PSK signal. An expected pseudo-random sequence for a PSK signal multiplied with different pseudo-random phase-shift keyed sequences generate waveforms with an average of zero, thereby making the signal essentially zero. However, multiplying the expected pseudo-random sequence PSK signal by reflected version of itself (e.g., a positive ("+") value multiplied by a positive ("+") value, or a negative ("−") value multiplied by a negative ("−") value) generates a relatively stronger response signal, whereby the average value is non-zero, or is substantially non-zero. As such, signal detector 834 may multiply one or more received waveforms by an expected pseudo random sequence PSK to strongly isolate the waveform sought.

Position determinator 836 includes a direction determinator 838 and distance calculator 839. In some examples, direction determinator 838 may be configured to determine a direction associated with a particular received PSK signal. For example, a specific pseudo-random sequence PSK signal can originate from a predetermined acoustic probe transducer having a specific orientation. Thus, when a pseudo-random sequence for a PSK signal is identified, the corresponding direction (or angle) can be determined. Distance calculator 839 can be configured to calculate a distance (or radial distance) to an object that caused reflection of a pseudo-random sequence PSK signal. In some examples, a reflection from a distant surface may be equivalent to a delay of the pseudo-random sequence. Thus, a delay in the multiplied waveform, when compared to the expected transmitted pseudo-random sequence PSK signal, can be equivalent to isolating reflections at a particular range. Multiple instances of such multiplications can be performed in parallel. As such, reflections can be detected at multiple distances in parallel. For example, multiplications can occur at expected delays at incremental distances (e.g., every 6 or 12 inches). A non-zero result determined at a particular delay indicates the range (e.g., 8 feet, 6 inches) from a media device. Note, too, that echoes not at a selected range increment may become invisible or attenuated, thereby improving the response for the specific one or more ranges selected. This can improve spatial and temporal resolutions. According to some examples, spatially-separated ultrasonic sensors can provide a slight time difference in the received signal, and, thus can provide orientation information in addition to distance information. Based on the determined direction and distances, position determinator 836 can determine a distance, for example, from a point in space incident with a local audio system to the audio source based on a sensed reflected ultrasonic signal from surfaces associated with an audio source. This information can transmitted as audio data 837, which can be used to generate a reproduced sound field to reproduce spatial audio at a remote location (or a local location). In some embodiments, the functionality of position determinator can be combined with that of signal detector 834.

Displacement determinator 840 includes a direction variation detector 842 and a distance variation detector 844. Direction variation detector 842 is configured to determine variations of direction (i.e., due to motion or movement) of an audio source, or a portion thereof, in terms of variations of angles or lateral distances, as described herein. Distance variation detector 844 can be configured to determine distances and variations thereof based on, for example, Doppler shifts of acoustic signals (e.g., ultrasonic, audible, or any other type of sound wave signal). Distance variation detector 844 can be configured to determine rates of change of distances for one or more surfaces from which acoustic signals are reflected. Displacement determinator 840, therefore, can determine variations in distances and directions (e.g., an angular direction) in any range of motion in an X, Y, and Z coordinate system (or expressed in polar coordinates). Such motion can be locomotive or a gesture.

Locomotion detector 846 is configured to detect locomotion or movement of one or more audio sources or objects that traverse one or more paths is a space associated with a sound field. In at least some embodiments, locomotion detector 846 determines predominant portions (e.g., all portions) of an object that are in motion, as detected by acoustic probe signals. Gesture detector 848 is configured to detect movement of one or more portions of one or more audio sources or objects, whereby the detected motion need not be related to locomotion. Displacement of at least a portion of an object, such as a listener or audio source, can be detected relative to non-transitory or substantially non-transitory portions of one or more audio sources. Gesture detector 848 detects that a particular movement associated with a portion of an object matches a pattern of motion specifying a gesture. An example of such motion is a gesture in which a user moves its hand in a rotational pattern or in an up-and-down pattern, just to name a few. Interface controller 879 is configured to receive data representing the identified gesture and translate that gesture into control data and/or a command for interfacing with the media device. For example, such commands can include changing volume, music, and other audio functions.

Figure 9:
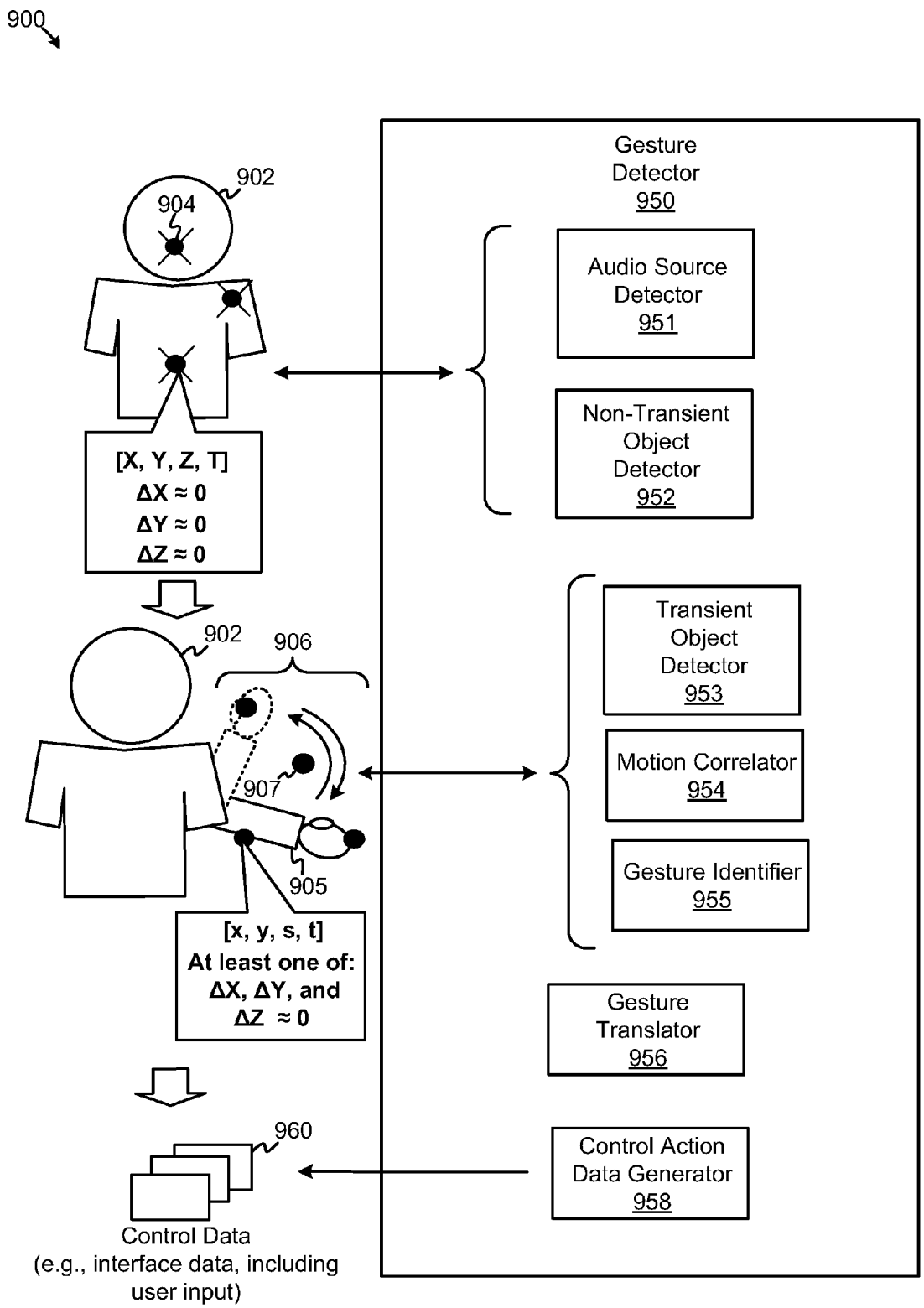
FIG. 9 depicts an example of a gesture detector, according to some embodiments.

FIG. 9 depicts an example of a gesture detector, according to some embodiments. As shown in diagram 900, gesture detector 950 includes an audio source detector 951, a non-transient object detector 952, a transient object detector 953, a motion correlator 954, a gesture identifier 955, a gesture translator 956, and a control action data generator 958. According to some embodiments, gesture detector 950 is configured to detect a gesture based on a displacement of at least a portion of an object. For example, audio source detector 951 can identify an object, such as audio source 902. In some embodiments, audio source detector 951 is configured to detect locomotion or some motion of object over a duration in which it is presumed an animate object (e.g., an object having at least some motion or some movement above a threshold over the duration) is indicative of person rather than a wall, a ceiling, furniture, and the like.

Non-transient object detector 952 can be configured to determine a portion of an audio source that is non-transitory by, for example, determining a first subset of unique ultrasonic signals associated with a portion (e.g., one or more surfaces) of the object that is non-transitory. As shown, surfaces 904 are indicated as non-transitory. Transient object detector 953 is configured to determine a second subset of unique ultrasonic signals that are associated with another portion of the object, whereby the other portion 905 transits through a region 906 (e.g., up and down) in which unique ultrasonic signals, including ultrasonic signal 907, determine one or more surfaces of arm 905 is transitory. Motion correlator 954 is configured to characterize motion of a portion 905 of object 902 to form characterized motion data, which describes the motion of the portion. Gesture identifier 955 is configured to compare the characterized motion against data representing patterns of motion. Each pattern of motion can be associated with a gesture. Therefore, a match of the characterized motion to a pattern of motion determines a gesture. Gesture translator 956 is configured to translate the identified gesture to a control action, such as a command or interface instruction to modify operation of a media device or to perform any other type of action. Control action data generator 958 is configured to generate a control action data signal 960 associated with the control action or command. The control action signal is configured to cause modified operation of the audio system or any other device.

According to some embodiments, gesture detector 950 or any other component of a displacement determinator can identify a change in orientation of one or more surfaces of an object rather than a gesture. Displacement that is not locomotive in nature and is not identified as a gesture can represent a change in orientation. For example, if a displacement determinator determines that characterized motion does not match a pattern of motion associated with a gesture, but such motion is relatively transitory (e.g., lower frequency of movements relative to a person's body), then a change in orientation of a surface, such as a user's face, is detected.

Figure 10:
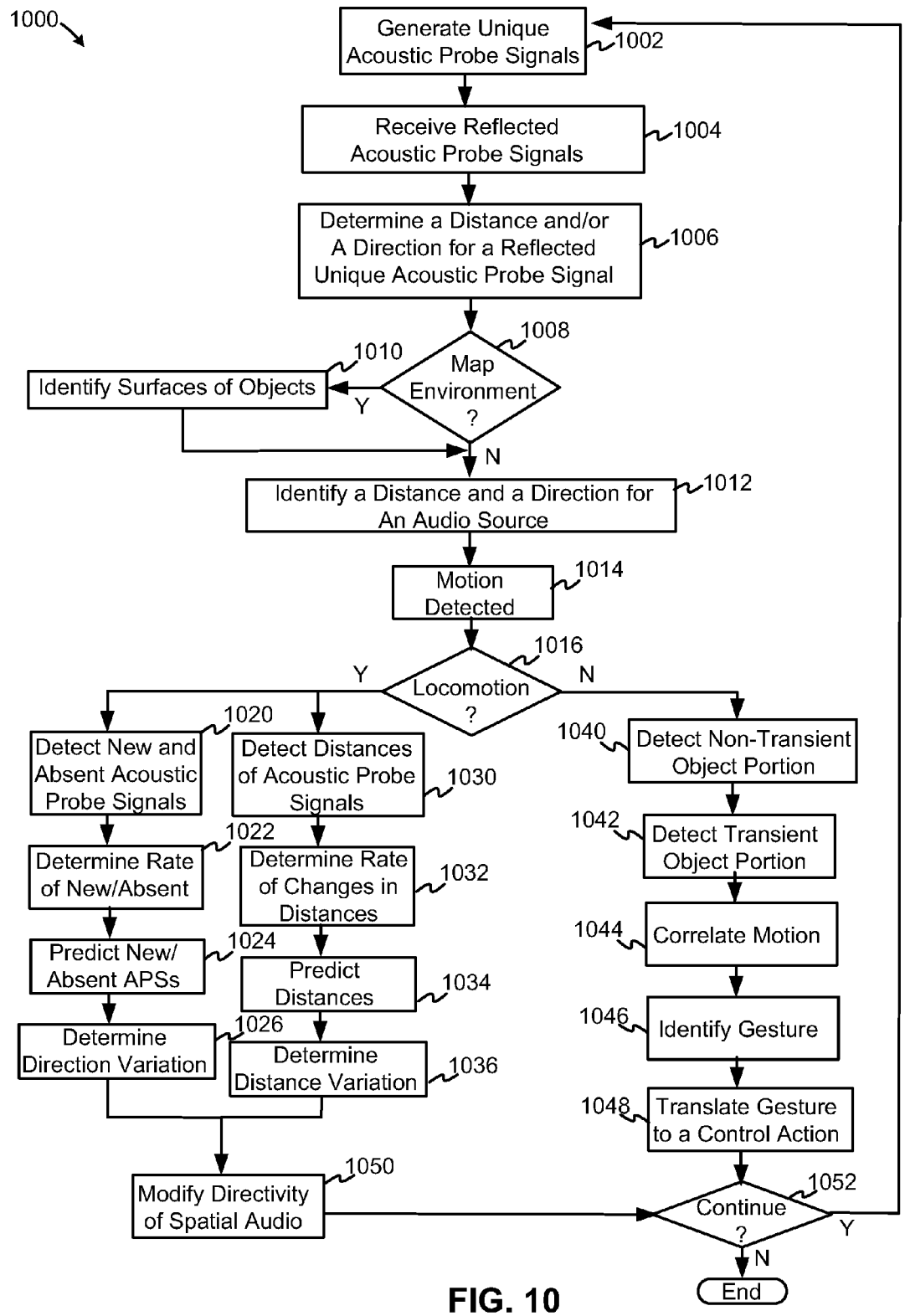
FIG. 10 is an example flow of determining displacement of an object in a sound field, according to some embodiments.

FIG. 10 is an example flow of determining displacement of an object in a sound field, according to some embodiments. Flow 1000 starts by generating at 1002 unique acoustic probe signals (e.g., unique PSK signals that can be associated to the acoustic transducers from which the unique signals were emitted). At 1004, reflected acoustic probe signals are received, each of which can be received by one or more acoustic sensors disposed at known geometries. A distance and/or a direction is determined at 1006. A determination at 1008 is made whether to map the environment to identify audio source and/or surfaces of a room, etc. If so, the spatial characteristics are determined for surfaces at 1010. If not, flow 1000 moves to 1012 at which a distance and/or a direction for an audio source is determined (e.g., for individual or aggregated reflected probe signals). At 1014, motion is detected.

A determination at 1016 is made whether to locomotion is associated with the motion. If so, flow 1000 moves to perform 1020 to 1026 and/or 1030 to 1036. At 1020, new and absent acoustic probes signals are detected as, for example, a user passes through beams of acoustic probes where new probe distances are determined and other beams of acoustic probes are "left behind" as the trailing edge of the user causes the absence of some probes to appear. At 1022, a rate at which new acoustic probes are detecting a surface and the loss or absence of other acoustic probes can indicate are relative speed of locomotion, whereby new or lost acoustic probes can be predicted at 1024 to anticipate a position with which to track the user to change directivity of the spatial audio. At 1026, a direction variation can be determined (e.g., a change of direction to another angle). At 1030, distances provided by acoustic probes signals are detected as, for example, being associated collectively with an object. At 1032, a rate at which the acoustic probes are detecting changes in distance can be calculated to predict a distance at a future time point at 1034. At 1036, a distance variation can be determined, after which directivity of spatial audio can be modified to project 3D audio to another point in space associated with the listener.

If a determination at 1016 is made that motion is not related to locomotion, flow 1000 moves to 1040 and 1042 at which non-transitory object portion and a transitory object portion are respectively determined. At 1044, motion is correlated to one or more patterns of motion to identify a gesture at 1046. At 1048, the gesture is translated into a command or control action to change operation of a media device or any other device. Flow 1000 continues to 1052 at which a determination is made whether to end or to continue flow 1000.

Figure 11A:
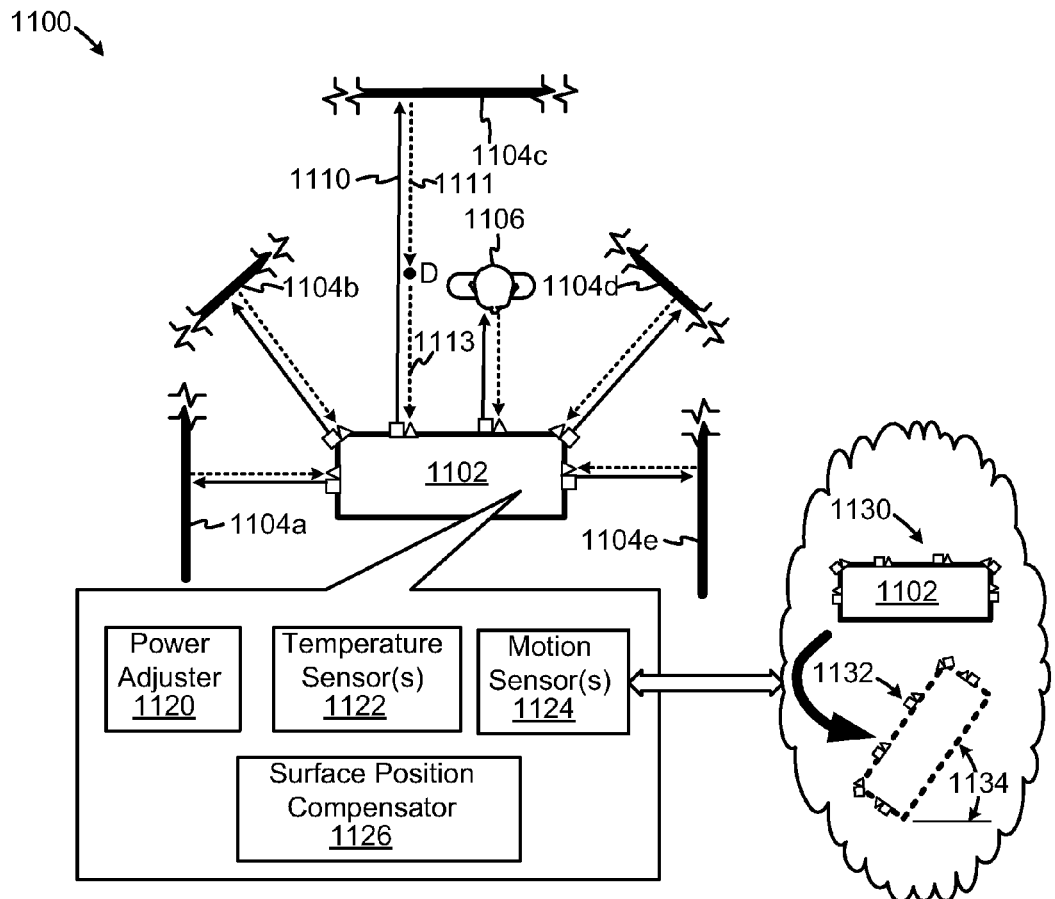
FIGS. 11A and 11B depict another example of a media device including components to compensate for an environment in which it is disposed, according to some embodiments.
Figure 11B:
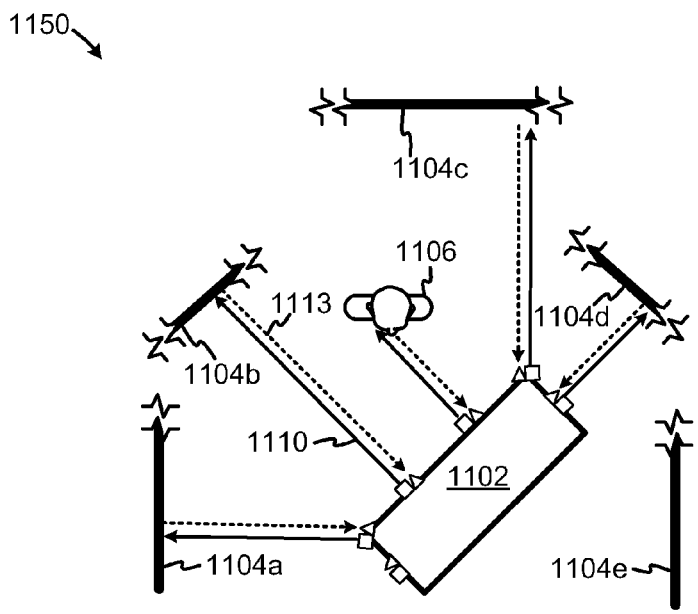

FIGS. 11A and 11B depict another example of a media device including components to compensate for an environment in which it is disposed, according to some embodiments. As shown in diagram 1100 of FIG. 11A, media device 1102 is configured to map an environment to identify surfaces 1104a to 1104e, including surfaces of person 1106. As shown, media device 1102 includes a power adjuster 1120, one or more temperature sensors 1122, one or more motion sensors 1124, and a media device orientation compensator 1126. In some embodiments, power adjuster 1120 is configured to selectively increase or decrease power of the emitted acoustic probe signals. As shown, acoustic probe signal 1110 is not intense enough for reflected acoustic probe signal 1111 to be received into an acoustic sensor. With power increased, reflected probe signal 1113 can be sensed by the acoustic sensor to identify farther distances. Temperature sensors 1122 detect the temperature of ambient air that can affect the rate at which the acoustic probes propagate through air. Acoustic transducers can operate to compensate for different temperatures. Motion sensors 1124, such as accelerometers, can detect a change from a first orientation 1130 of media device to a second orientation 1132, whereby the resultant orientation is at an angle 1134. Surface position compensator 1126 is configured to predict spatial positions of the surfaces detected based on the previous determinations. As shown, diagram 1150 of FIG.

11B depicts a media device 1102 that has been reoriented. Shortly after the change in orientation, surface position compensator 1126 can predict the relative spatial positions of surfaces 1104a to 1104d and can predict which acoustic transducers and sensors can be associated with a corresponding surface.

Figure 12:
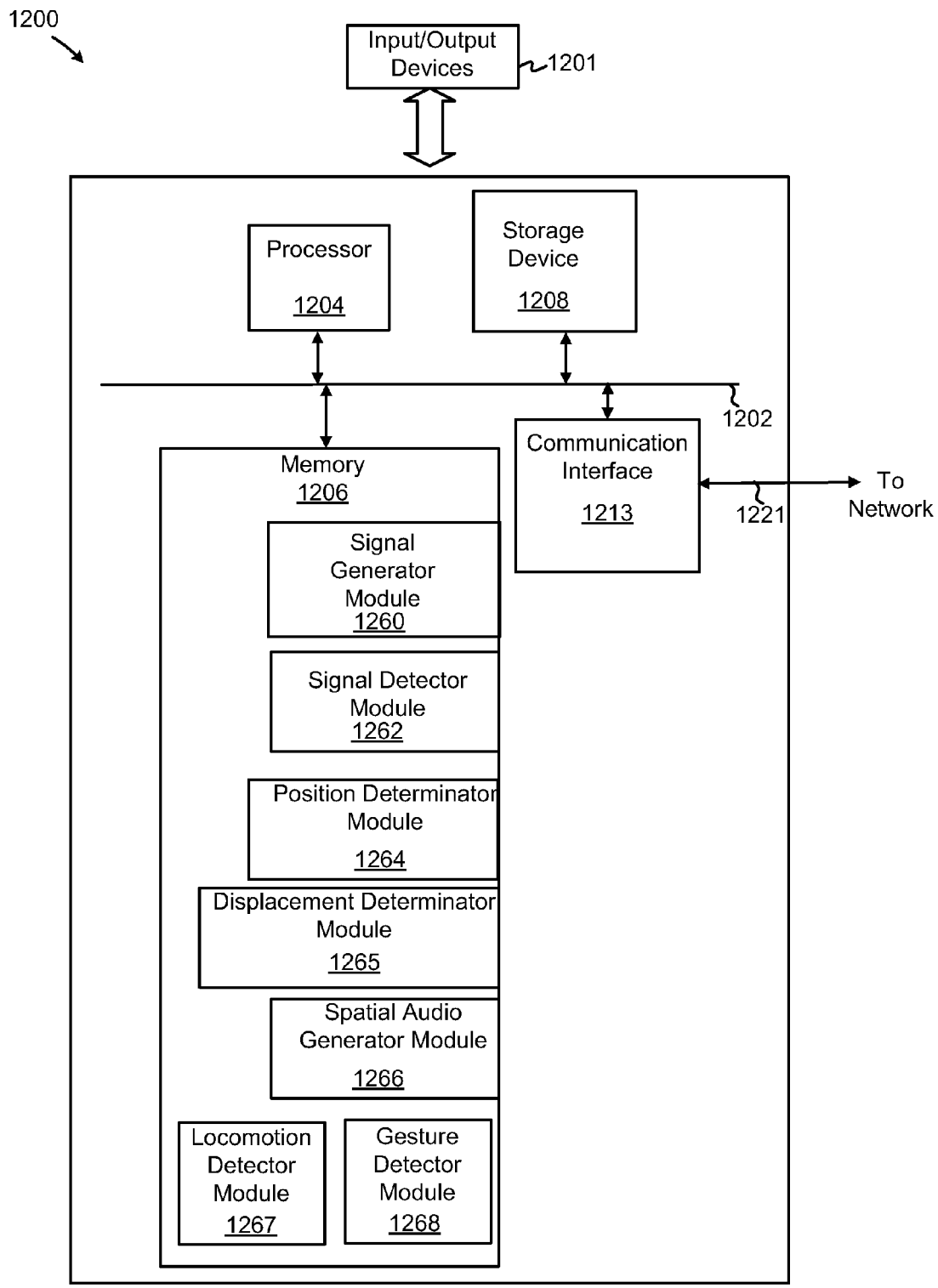
FIG. 12 illustrates an exemplary computing platform disposed in a media device in accordance with various embodiments.

FIG. 12 illustrates an exemplary computing platform disposed in a media device in accordance with various embodiments. In some examples, computing platform 1200 may be used to implement computer programs, applications, methods, processes, algorithms, or other software to perform the above-described techniques. Computing platform 1200 includes a bus 1202 or other communication mechanism for communicating information, which interconnects subsystems and devices, such as processor 1204, system memory 1206 (e.g., RAM, etc.), storage device 1208 (e.g., ROM, etc.), a communication interface 1213 (e.g., an Ethernet or wireless controller, a Bluetooth controller, etc.) to facilitate communications via a port on communication link 1221 to communicate, for example, with a computing device, including mobile computing and/or communication devices with processors. Processor 1204 can be implemented with one or more central processing units ("CPUs"), such as those manufactured by Intel® Corporation, or one or more virtual processors, as well as any combination of CPUs and virtual processors. Computing platform 1200 exchanges data representing inputs and outputs via input-and-output devices 1201, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 1200 performs specific operations by processor 1204 executing one or more sequences of one or more instructions stored in system memory 1206, and computing platform 1200 can be implemented in a client-server arrangement, peer-to-peer arrangement, or as any mobile computing device, including smart phones and the like. Such instructions or data may be read into system memory 1206 from another computer readable medium, such as storage device 1208. In some examples, hard-wired circuitry may be used in place of or in combination with software instructions for implementation. Instructions may be embedded in software or firmware. The term "computer readable medium" refers to any tangible medium that participates in providing instructions to processor 1204 for execution. Such a medium may take many forms, including but not limited to, non-volatile media and volatile media. Non-volatile media includes, for example, optical or magnetic disks and the like. Volatile media includes dynamic memory, such as system memory 1206.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1202 for transmitting a computer data signal.

In some examples, execution of the sequences of instructions may be performed by computing platform 1200. According to some examples, computing platform 1200 can be coupled by communication link 1221 (e.g., a wired network, such as LAN, PSTN, or any wireless network) to any other processor to perform the sequence of instructions in coordination with (or asynchronous to) one another. Computing platform 1200 may transmit and receive messages, data, and instructions, including program code (e.g., application code) through communication link 1221 and communication interface 1213. Received program code may be executed by processor 1204 as it is received, and/or stored in memory 1206 or other non-volatile storage for later execution.

In the example shown, system memory 1206 can include various modules that include executable instructions to implement functionalities described herein. In the example shown, system memory 1206 includes a signal generator module 1260 configured to implement signal generation of a modulated acoustic probe signal. Signal detector module 1262, position determinator module 1264, displacement determinator module 1265, a spatial audio generator module 1266, a locomotion detector module 1267, and a gesture detector module 1268 each can be configured to provide one or more functions described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method comprising:
   generating unique ultrasonic signals, at least a unique ultrasonic signal being generated by emission from a corresponding acoustic probe transducer;
   emitting the unique ultrasonic signal in a direction associated with the acoustic probe transducer;
   sensing reflected ultrasonic signals from one or more surfaces, a subset of surfaces being associated with an object;
   identifying a position of the object relative to a point in space as a function of characteristics of the reflected ultrasonic signals;
   mapping an environment to detect relatively immobile surfaces within the environment in which the object is substantially positioned to modify a power level associated with the unique ultrasonic signal using a power adjuster in an audio device configured to emit the unique ultrasonic signal, the power adjuster being configured to modify the power level based on a temperature associated with ambient air in the environment using a temperature sensor in the audio device;
   determining a displacement of at least a portion of the object;
   identifying an action responsive to the displacement; and
   performing the action to modify operation of the audio system.

2. The method of claim 1, wherein performing the action comprises:
   changing directivity of sound beams configured to provide spatial audio to an audio space including a recipient of audio as the object.

3. The method of claim 1, wherein performing the action comprises:
   detecting a gesture based on the displacement of the at least a portion of the object; and modifying generation of spatial audio based on the gesture.

4. The method of claim 1, wherein determining the displacement comprises: determining values representative of modified characteristics.

5. The method of claim 4, wherein determining the values representative of the modified characteristics comprises: detecting a variation in a direction.

6. The method of claim 5, wherein detecting the variation in the direction comprises: detecting a variation in an angle.

7. The method of claim 4, wherein determining the values representative of the modified characteristics comprises: detecting a variation in a distance.

8. The method of claim 1, further comprising: detecting locomotion of the object based on the displacement.

9. The method of claim 1, further comprising:
sensing reflected ultrasonic signals from the subset of surfaces associated with the object;
modifying, using the power adjuster, the power level of the unique ultrasonic signal based on an orientation of at least one of the plurality of acoustic probe transducers in the environment relative to the object using a motion sensor in the audio device;
calculating one or more variations of distances between the point in space and the subset of surface to form one or more calculated distance variations; and
identifying a next position of the portion of the object based on the one or more calculated distance variations that is either closer or farther relative to the point in space.

10. The method of claim 1, further comprising:
sensing a first subset of reflected ultrasonic signals from the subset of surfaces associated with the object at a first time point;
sensing a second subset of reflected ultrasonic signals from the subset of surfaces associated with the object at a second time point;
calculating one or more variations of directions between the subset of surfaces at the first time point and the subset of surfaces at the second time point to form one or more calculated direction variations; and
identifying a next position of the portion of the object based on the one or more calculated direction variations that is either in a first lateral direction or in a second lateral direction relative to the point in space.

11. The method of claim 10, wherein the one or more variations of directions comprise: one or more angles, wherein the one or more calculated direction variations is either in
a negative angular direction or in a positive angular direction relative to the point in space.

12. The method of claim 1, further comprising:
detecting a gesture based on the displacement of the at least a portion of the object, detecting the gesture comprising:
determining a first subset of the unique ultrasonic signals associated with another portion of the object;
identifying the first subset of the unique ultrasonic signals indicate that the another portion of the object is non-transitory;
determining a second subset of the unique ultrasonic signals associated with the portion of the object; and
identifying the second subset of the unique ultrasonic signals indicate that the another portion of the object is transitory.

13. The method of claim 12, further comprising:
characterizing motion of the another portion of the object to form characterized motion;
comparing the characterized motion against data representing patterns of motion each of which is associated with a gesture; and
detecting a match of the characterized motion to a pattern of motion to determine an identified gesture.

14. The method of claim 13, further comprising:
translating the identified gesture to a control action; and
generating control action signal associated with the control action,
wherein the control action signal is configured to cause modified operation of the audio system.

15. The method of claim 12, further comprising:
characterizing motion of the another portion of the object to form characterized motion;
comparing the characterized motion against data representing patterns of motion each of which is associated with a gesture;
detecting no match of the characterized motion to the patterns of motion; and
identifying that the characterized motion is indicative of a change in orientation of the object.

16. An apparatus comprising:
a plurality of transducers configured to emit audible acoustic signals into a region including one or more audio sources;
a plurality of acoustic probe transducers configured to emit ultrasonic signals, at least a subset of the acoustic probe transducers each is configured to emit a unique ultrasonic signal;
a power adjuster configured to modify a power level of the unique ultrasonic signal based on a temperature associated with ambient air in an environment in which the one or more audio sources are substantially positioned;
a temperature sensor coupled with the power adjuster and configured to generate a signal indicative of the temperature;
a plurality of acoustic sensors configured to sense received ultrasonic signals reflected from the one or more audio sources;
a controller configured to determine a displacement of at least a portion of an audio source of the one or more audio sources; and
an environmental mapper configured to determine spatial characteristics of relatively immobile surfaces within the environment.

17. The apparatus of claim 16, wherein the controller comprises:
a locomotion detector configured to detect locomotion of the audio source based on the displacement; and
a gesture detector configured to detect a gesture based on the displacement of the portion of the audio source.

18. The apparatus of claim 17, further comprising:
a motion sensor coupled with the power adjuster, the motion sensor including accelerometers configured to generate signals indicative of an orientation of at least one of the plurality of acoustic probe transducers in the environment, and wherein the power adjuster being configured to modify the power level of the unique ultrasonic signal based on the orientation of the at least one of the plurality of acoustic probe transducers in the environment relative to the one or more audio sources;
a motion correlator configured to correlate the displacement with data representing a gesture;
a gesture identifier configured to identify the gesture;

a gesture translator configured to translate the gesture to a control action command; and a control action data generator configured to generate the control action command to control operation of the apparatus.

19. The apparatus of claim 16, further comprising: a phase-shift key signal modulator configured to generate the unique ultrasonic signal.

* * * * *